(12) United States Patent
Mimura et al.

(10) Patent No.: US 8,388,154 B2
(45) Date of Patent: Mar. 5, 2013

(54) CUBE-CORNER RETROREFLECTIVE ARTICLE

(75) Inventors: Ikuo Mimura, Uozu (JP); Chihiro Hayashi, Namekawa (JP); Keiji Amemiya, Namekawa (JP)

(73) Assignee: Nippon Carbide Industries Co., Inc., Tokyo (JP)

( * ) Notice: Subject to any disclaimer, the term of this patent is extended or adjusted under 35 U.S.C. 154(b) by 392 days.

(21) Appl. No.: 12/674,708

(22) PCT Filed: Aug. 22, 2008

(86) PCT No.: PCT/JP2008/002284
§ 371 (c)(1),
(2), (4) Date: Jul. 14, 2010

(87) PCT Pub. No.: WO2009/028162
PCT Pub. Date: Mar. 5, 2009

(65) Prior Publication Data
US 2011/0043915 A1    Feb. 24, 2011

(30) Foreign Application Priority Data

Aug. 24, 2007  (JP) ................. 2007-218900
Jul. 24, 2008  (JP) ................. 2008-190375

(51) Int. Cl.
*G02B 5/124* (2006.01)
(52) U.S. Cl. ...................................... 359/530
(58) Field of Classification Search .......... 359/529, 359/530
See application file for complete search history.

(56) References Cited

U.S. PATENT DOCUMENTS

| | | | |
|---|---|---|---|
| 3,833,285 A | 9/1974 | Heenan | |
| 3,873,184 A | 3/1975 | Heenan | |
| 3,923,378 A | 12/1975 | Heenan | |
| 3,926,402 A | 12/1975 | Heenan | |
| RE29,396 E | 9/1977 | Heenan | |
| 5,585,164 A | 12/1996 | Smith et al. | |
| 5,981,032 A | 11/1999 | Smith et al. | |
| 6,010,609 A | 1/2000 | Mimura et al. | |
| 6,015,214 A | 1/2000 | Heenan et al. | |
| 6,253,442 B1 | 7/2001 | Benson et al. | |
| 6,257,860 B1 | 7/2001 | Luttrell et al. | |
| 6,302,992 B1 | 10/2001 | Smith et al. | |
| 6,318,987 B1 * | 11/2001 | Luttrell et al. | 359/529 |
| 6,767,102 B1 | 7/2004 | Heenan et al. | |
| 6,884,371 B2 | 4/2005 | Smith | |
| 7,152,983 B2 | 12/2006 | Smith | |

FOREIGN PATENT DOCUMENTS

| | | |
|---|---|---|
| CA | 2 394 933 | 6/2001 |
| JP | 51-82592 | 7/1976 |
| JP | 52-011200 | 1/1977 |
| JP | 58-005401 | 1/1983 |
| JP | 2001-166119 | 6/2001 |
| WO | 99/01275 | 1/1999 |
| WO | 2004/081619 | 9/2004 |

* cited by examiner

*Primary Examiner* — Euncha Cherry
(74) *Attorney, Agent, or Firm* — Fitzpatrick, Cella, Harper & Scinto

(57) ABSTRACT

A cube-corner retroreflective article is provided with a number of cube-corner retroreflective element pairs each formed by a pair of cube-corner retroreflective elements sharing one side. Each of the cube-corner retroreflective elements has reflective lateral surfaces including two trapezoidal reflective lateral surfaces and one pentagonal or isosceles-triangular reflective lateral surface, and a projection shape of a quadrangle when projected onto a common plane, wherein ratios (rHA/rHC and rHB/rHC) between a length (rHC) of a ridge (HC) shared by the trapezoidal reflective lateral surfaces (HAFC and HBGC) and lengths (rHA and rHB) of other ridges (HA and HB) are in a range of 0.5 to 1.5.

11 Claims, 28 Drawing Sheets

CUBE-CORNER RETROREFLECTIVE ARTICLE

TECHNICAL FIELD

The invention relates to a retroreflective article that can be preferably used for traffic signs, construction work signs, retroreflective clothing, reflectors for optical sensors, vehicle markings, or the like and that is excellent in an entrance angle characteristic, an observing angle characteristic, and a rotation angle characteristic.

The invention more particularly relates to a retroreflective sheeting that can be preferably used for traffic signs or the like, and that has an entrance angle characteristic, an observing angle characteristic, and a rotation angle characteristic that are improved.

BACKGROUND ART

Conventionally, various suggestions are made for a cube-corner retroreflective article provided with a number of quadrilateral element pairs each formed by a pair of quadrilateral elements, in which each of the quadrilateral elements is a cube-corner element having reflective lateral surfaces including two trapezoidal reflective lateral surfaces and one pentagonal or isosceles-triangular reflective lateral surface, having a projection shape of a quadrangular when projected onto a common plane, and sharing one side (DE or AB) of the pentagonal or isosceles-triangular reflective lateral surface with the other one in the pair.

Japanese Patent Application Laid-Open No. 51-082592 (Patent Document 1), Japanese Patent Application Publication No. 52011200 (Patent Document 2), and Japanese Patent Application Publication No. 58-005401 (Patent Document 3) all of which are for inventions by Tanaka, for example, disclose that a number of quadrilateral elements, each of which is formed at an end of a pin having a quadrilateral section, are collected to form a cube-corner retroreflective article in such a manner that optical axes of the quadrilateral elements tilt so as to improve an entrance angle characteristic. As a specific amount of the tilt angle of the optical axes, 12 DEG is disclosed; however, it is not disclosed how much tilt angle is preferable. Also, it is not disclosed a quadrilateral element of which shape has an entrance angle characteristic, an observation angle characteristic, and a rotation angle characteristic that are preferable.

In addition, U.S. Pat. No. 3,833,285 (Patent Document 4), U.S. Pat. No. 3,873,184 (Patent Document 5), U.S. Pat. No. 3,923,378 (Patent Document 6), U.S. Pat. No. 3,926,402 (Patent Document 7), and U.S. Pat. No. RE29,396 (Patent Document 8), all to Heenan, disclose a method of improving an observation angle characteristic, in which deviations are provided for apex angles and disclose a combination of elements respectively having optical axes in different directions.

Further, U.S. Pat. No. 6,015,214 (Patent Document 9) and U.S. Pat. No. 6,767,102 (Patent Document 10), both to Heenan, disclose that a number of quadrilateral elements, each of which is formed at an end of a thin plate, are stacked to form a cube-corner retroreflective article in such a manner that optical axes of the quadrilateral elements tilt so as to improve an entrance angle characteristic.

FIG. 28 of Patent Document 9 shows modified examples of a shape of the quadrilateral element. A quadrilateral element having an apex of off-center (Apex Decentration) is illustrated as a first example, a quadrilateral element having a shape with a larger width (boundary proportion) is illustrated as a second example, and a quadrilateral element having an optical axis that tilts (Axis Cant) is illustrated as a third example. However, it is not disclosed a quadrilateral element of which shape has an entrance angle characteristic, an observation angle characteristic, and a rotation angle characteristic that are preferable.

In addition, U.S. Pat. No. 5,981,032 (Patent Document 11) and U.S. Pat. No. 6,302,992 (Patent Document 12) to Smith et al U.S. Pat. No. 6,889,371 (Patent Document 13) and U.S. Pat. No. 7,152,983 (Patent Document 14) to Smith, U.S. Pat. No. 6,253,442 (Patent Document 15) to Benson et al., and U.S. Pat. No. 6,318,987 (Patent Document 16) to Luttrel et al. disclose a method of forming a mold suitable for manufacturing a retroreflective article formed with quadrilateral elements by forming a cube-corner element at an end face of a thin plate (lamina) and combining a number of the thin plates.

However, it is not disclosed, in any of the patent documents, quadrilateral elements of which shape to use so as to provide an excellent retroreflective characteristic, in particular, an entrance angle characteristic and a rotation angle characteristic that are excellent.

Also, a tilt direction of an optical axis of a quadrilateral element disclosed in any of the patent documents is limited to a direction perpendicular to one side (DE or AB) of a pentagonal or isosceles-triangular reflective lateral surface of the quadrilateral element.

Patent Document 1: Japanese Patent Application Laid-Open No. 51-082592
Patent Document 2: Japanese Patent Application Publication No. 52-011200
Patent Document 3: Japanese Patent Application Publication No. 58-005401
Patent Document 4: U.S. Pat. No. 3,833,285
Patent Document 5: U.S. Pat. No. 3,873,184
Patent Document 6: U.S. Pat. No. 3,923,378
Patent Document 7: U.S. Pat. No. 3,926,402
Patent Document 8: U.S. Pat. No. RE29,396
Patent Document 9: U.S. Pat. No. 6,015,214
Patent Document 10: U.S. Pat. No. 6,767,102
Patent Document 11: U.S. Pat. No. 5,981,032
Patent Document 12: U.S. Pat. No. 6,302,992
Patent Document 13: U.S. Pat. No. 6,884,371
Patent Document 14: U.S. Pat. No. 7,152,983
Patent Document 15: U.S. Pat. No. 6,253,442
Patent Document 16: U.S. Pat. No. 6,318,987

DISCLOSURE OF THE INVENTION

Problems to be Solved by the Invention

An object to be solved by the invention is to improve a retroreflective characteristic of a quadrilateral element, that is a cube-corner element having reflective lateral surfaces Including two trapezoidal reflective lateral surfaces and one pentagonal or isosceles-triangular reflective lateral surface, and having a projection shape of a quadrilateral when projected onto a common plane.

An object is particularly to provide a cube-corner retroreflective article including a quadrilateral element that is excellent in entrance angle and rotation angle characteristics.

An object is to supply a retroreflective article that can be preferably used for traffic signs, construction work signs, retroreflective clothing, reflectors for optical sensors, license plates or vehicle markings as specific applications.

Means for Solving the Problems

The invention is to provide a cube-corner retroreflective article that is provided with a number of quadrilateral cube-corner elements in pairs, in which each of the quadrilateral cube-corner elements has reflective lateral surfaces including two trapezoidal reflective lateral surfaces (HAFC and HBGC) and one pentagonal (HADES) or isosceles-triangular (HAB) reflective lateral surface and shares one side with the other one in the pair and that is excellent in entrance angle and rotation angle characteristics.

Conventionally, a quadrilateral element as described above has been well known. However, it has not been clear a quadrilateral element of which shape is excellent in entrance angle and rotation angle characteristics.

Generally, a retroreflection of a cube-corner retroreflective element toward a light source can be attained through three reflections on three reflective lateral surfaces of a cube-corner element. At this time, the three reflective lateral surfaces preferably have substantially the same area in order to achieve an effective retroreflection.

In addition, it has been long known that forming an element in such a manner that its optical axis tilts is effective as a means for improving an entrance angle characteristic. However, it has been known that the tilt of the optical axis changes shapes of reflective lateral surfaces of the element, and thus changes an area ratio of three reflective lateral surfaces of the retroreflective element, resulting in a deterioration of a retroreflective efficiency.

Further, the element is preferably in a shape nearly a so-called full-cube element having a projection shape of a sexangular in order to have an excellent rotation angle characteristic. It is preferable that the full-cube element has a shape in which three surfaces are of square and areas of three reflective lateral surfaces are the same as well as lengths in longitudinal and widthwise directions of a reflective lateral surface are the same.

Also a rotation angle characteristic can be improved by using a combination of retroreflective elements having optical axes, which tilt in different directions. In a triangular pyramid retroreflective element or a quadrilateral element that is conventionally known, two elements having optical axes tilting in opposite directions to each other has been generally used as a pair.

However, according to the conventionally known technique, shapes of reflective lateral surfaces are formed longer than necessary. Accordingly, their areas that do not contribute to the retroreflection are too large, which often deteriorates a retroreflective efficiency. In addition, it has not been known a quadrilateral element of which shape can provide an excellent retroreflective efficiency, entrance angle characteristic, or rotation angle characteristic.

In order to give an excellent entrance angle characteristic or a rotation angle characteristic to a quadrilateral element according to the invention, it is preferable that a cube-corner retroreflective article is provided with a number of cube-corner retroreflective element pairs each formed by a pair of cube-corner retroreflective elements, each of the cube-corner retroreflective elements having reflective lateral surfaces including two trapezoidal reflective lateral surfaces and one pentagonal or isosceles-triangular reflective lateral surface, having a projection shape of a quadrangle when projected onto a common plane, and sharing one side with the other one in the pair, wherein ratios (rHA/rHC and rHB/rHC) between a length (rHC) of a ridge (HC) shared by the trapezoidal reflective lateral surfaces (HAFC and HBGC) and lengths (rHA and rHB) of the other ridges (HA and HB) shared by the two trapezoidal reflective lateral surfaces (HAFC and HBGC) and the pentagonal or isosceles-triangular reflective lateral surface are in a range of 0.5 to 1.5.

When the ratios (rHA/rHC and rHB/rHC) of the lengths (rHA and rHB) are in the range of 0.5 to 1.5 in a quadrilateral element, the three reflective lateral surfaces (HAFC, HBGC and HADES) have areas with small differences from each other and each of the reflective lateral surfaces becomes a shape having almost the same lengths in longitudinal direction and in widthwise direction, and thus such a quadrilateral element is preferable.

When the ratios (rHA/rHC and rHB/rHC) are less than 0.5 in an element, the lengths of the ridges HA and HB become shorter compared to the ridge HC in the reflective lateral surfaces (HAFC and HBGC) Accordingly, the shapes of the reflective lateral surfaces become too elongate, resulting in that areas around points F and G, which are apexes of the reflective lateral surfaces, do not contribute to the retroreflection, and thus the element is not preferable.

On the other hand, when the ratios (rHA/rHC and rHB/rHC) are more than 1.5 in an element, the lengths of the ridges HA and HB become longer compared to the ridge HC in the reflective lateral surfaces (HAFC and HBGC). Accordingly, the shapes of the reflective lateral surfaces become too short, resulting in that areas that are to contribute to the retroreflection around points F and G, which are apexes of the reflective lateral surfaces, are insufficient, and thus the element is not preferable.

The ratios (rHA/rHC and rHB/rHC) are preferably in a range of 0.7 to 1.3, and further preferably in a range of 0.8 to 1.2 in a quadrilateral element according to the invention; from a standpoint of improving a retroreflective efficiency and a rotation angle characteristic.

It is preferable that ratios (Sc/Sa and Sc/Sb) between areas (Sa and Sb) of the trapezoidal reflective lateral surfaces (HAFC and HBGC) and a area (Sc) of the pentagonal reflective lateral surface (HADEB) or the isosceles-triangular reflective lateral surface (HAB) is in a range of 0.6 to 1.4, from a standpoint of improving the retroreflective efficiency.

When the area ratios (Sc/Sa and Sc/Sb) of the reflective lateral surfaces are in the range of 0.6 to 1.4, deterioration of an efficiency of three reflections on the three reflective lateral surfaces can be suppressed, and thus such configuration is preferable.

It is more preferable that the area ratios (Sc/Sa and Sc/Sb) of the reflective lateral surfaces are in a range of 0.95 to 1.05. When the area ratios are in a range of 0.97 to 1.03, the retroreflective efficiency can be further improved.

It is preferable that a ratio (rHK/rHC) between a length (rHC) of the ridge (HC) shared by the trapezoidal reflective lateral surfaces (HAFC and HBGC) in a quadrilateral element according to the invention and a length (rHK) of a perpendicular (HK) from an apex (H) of the element to a base (DE) that is shared by two cube-corner retroreflective elements is in a range of 0.55 to 1.8, from a standpoint of improving the rotation angle characteristic and the entrance angle characteristic.

The entrance angle characteristic can be improved by setting the ratio (rHK/rHC) in the range of 0.55 to 1.8. The rotation angle characteristic is deteriorated when the ratio is either too large or too small, and thus the ratio is preferably in a range of 0.65 to 1.65 in order to obtain the entrance angle characteristic and the rotation angle characteristic in a balanced manner. Further, it is more preferable that the ratio is in a range of 0.8 to 1.4 from a standpoint of improving the rotation angle characteristic and the entrance angle characteristic.

According to the invention, a tilt angle (θ) of optical axes of the elements may be −30 to +30 DEG with respect to a perpendicular to the common plane.

According to the invention, the entrance angle characteristic can be improved when the optical axis tilts. The tilt angle ($\theta$) is preferably in the range of −30 to +30 DEG, and further preferably in a range of −20 to −5 DEG or +5 to +20 because the entrance angle characteristic can be further improved.

It is preferable that the length (rHC) of the ridge (HC) shared by the trapezoidal reflective lateral surfaces (HAFC and HBGC) of the element is 30 to 500 μm because the reflective article can be flexible so as to be easily attached on a curved surface and easily bolted to a roll. When the length (rHC) of the ridge is 30 μm or more, a diffraction efficiency is not too large and then a retroreflected light is prevented from largely scattering. Therefore, such configuration is preferable. In addition, it is preferable that the length is 300 μm or less because a flexible sheeting product can be easily obtained.

It is further preferable that the length (rHC) of the ridge (HC) shared by the trapezoidal reflective lateral surfaces (RAFC and (HC) of the element is 50 to 150 μm because the reflective article can be flexible so as to be easily attached on a curved surface and easily bolted to a roll. When the length (rHC) of the ridge is 50 μm or more, a diffraction efficiency is not too large and then a retroreflected light is prevented from largely scattering. Therefore, such configuration is preferable. In addition, it is preferable that the length is 150 μm or less because a flexible sheeting product can be easily obtained.

In addition, a cube-corner retroreflective article according to the invention preferably includes a number of cube-corner retroreflective element pairs each formed by a pair of cube-corner retroreflective elements sharing one side (DE) so as to be a symmetric Pair; each of the cube-corner retroreflective elements having reflective lateral surfaces including two trapezoidal reflective lateral surfaces (SA surface and SB surface) and one pentagonal or triangular reflective lateral surface (SC surface), and having a projection shape of a rectangle (including a square) when projected onto a common plane, wherein optical axes of the cube-corner retroreflective elements tilt in a direction parallel to the shared side (DE).

When the optical axes tilt in a direction parallel to the shared side (DE), an entrance angle characteristic and a rotation angle characteristic can be improved in the invention.

The optical axes of all elements may tilt in the same direction, or elements having the optical axes tilting in the same direction and elements having the optical axes tilting in an opposite direction may be mixed as long as the optical axes are parallel to the shared side (DE).

An aspect of the mixture is not particularly limited; however, elements having optical axes tilting in the same direction and the elements having optical axes tilting in the opposite direction may be alternately arranged, one element having optical axes tilting in the same direction and one element having optical axes tilting in the opposite direction may be alternately arranged, or the elements having optical axes tilting in the same direction may be arranged in some region while the elements having optical axes tilting in the opposite direction may be arranged in a region adjacent to the some region.

If the regions are too large, a reflective characteristic in each region in a cube-corner retroreflective article as a resultant is deteriorated, resulting in a poor appearance. Therefore, it is preferable that the elements having optical axes tilting in the same direction and the elements having optical axes tilting in the opposite direction are alternately arranged or one element having optical axes tilting in the same direction and one element having optical axes tilting in the opposite direction are alternately arranged.

In the invention, it is preferable that the optical axes tilting in the opposite direction are mixed because the entrance angle characteristic and the rotation angle characteristic may be further improved.

In the invention, it is preferable that the two optical axes tilt in the same direction parallel to the shared side (DE) in some of the element pairs and the two optical axes tilt in opposite direction in element pairs adjacent to the some of the element pairs in an extending direction of the shared side (DE) because a cube-corner retroreflective article can be easily manufactured and the entrance angle characteristic and the rotation angle characteristic can be improved.

In the invention, a horizontal tilt angle ($\theta v$) that is a component, which is parallel to the shared side (DE), of the tilt angle ($\theta$) of the optical axes is preferably in a range of 0.5 to 30 DEG and further preferably in a range of 5 to 20 DEG with respect to a perpendicular to the common plane because the entrance angle characteristic can be improved.

In the invention, it is preferable that two optical axes of each of the cube-corner retroreflective element pairs tilt in both directions parallel to the shared side (DE) and perpendicular to the shared side (DE) because the entrance angle characteristic and the rotation angle characteristic can be further improved.

In the invention, a horizontal tilt angle (Oh) that is a component, which is perpendicular to the shared side (DE), of the tilt angle ($\theta$) of the optical axes is preferably in a range of 0.5 to 30 DEG and further preferably in a range of 5 to 20 DEG with respect to the perpendicular to the common plane because the entrance angle characteristic can be improved.

In the invention, a ratio ($\theta v/\theta h$) between the horizontal tilt angle ($\theta v$) that is a component, which is parallel to the shared side (DE), of the tilt angle ($\theta$) of the optical axes and the horizontal tilt angle ($\theta h$) that is a component, which is perpendicular to the shared side (DE), of the tilt angle ($\theta$) of the optical axes is preferably in a range of 0.5 to 1.5, further preferably in a range of 0.8 to 1.2, and particularly preferably 1.0 because the entrance angle characteristic and the rotation angle characteristic can be improved in a balanced manner.

It is preferable that a length (rHC) of a ridge (HC) shared by the trapezoidal reflective lateral surfaces (HAFC and HBGC) of the element is in a range of 30 to 500 μm because the reflective article can be flexible so as to be easily attached on a curved surface and easily bolted to a roll. It is preferable that the element has the ridge of length (rHC) 30 μm or more because a diffraction efficiency is not too large and then a retroreflected light is prevented from largely scattering. In addition, it is preferable that the element has the ridge of length 300 μm or less because a flexible sheeting product can be easily obtained.

It is further preferable that, a length (rHC) of a ridge (HC) shared by the trapezoidal reflective lateral surfaces (HAFC and HBGC) of the element is in a range of 50 to 150 μm because the reflective article can be flexible so as to be easily attached on a curved surface and easily bolted to a roll. It is preferable that the element has the ridge of length (rHC) 50 μm or more because a diffraction efficiency is not too large and then a retroreflected light is prevented from largely scattering. In addition, it is preferable that the element has the ridge of length 150 μm or less because a flexible sheeting product can be easily obtained.

Effect of the Invention

According to the invention, an entrance angle characteristic, an observing angle characteristic, and a rotation angle characteristic can be improved and particularly, a retroreflective article having an improved entrance angle characteristic and rotation angle characteristic can be provided.

BEST MODE FOR CARRYING OUT THE INVENTION

Figure 1:
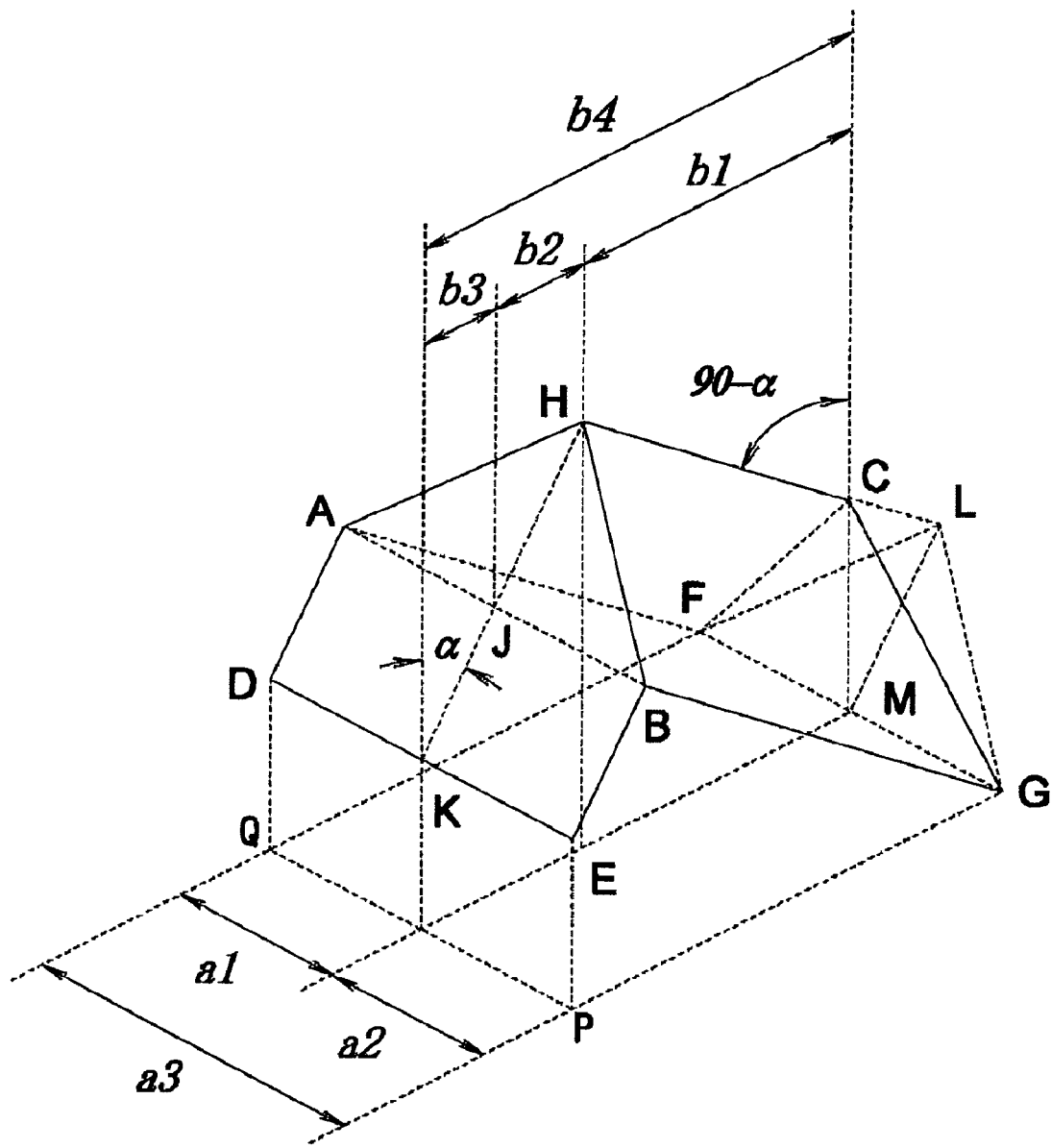
FIG. 1 is a perspective view for illustrating an element of a cube-corner retroreflective article according to a conventional technique and this invention.

Preferable embodiments of a cube-corner retroreflective article according to the invention will be described hereinafter referring to the drawings.

The invention relates to a cube-corner retroreflective article that is provided with a number of cube-corner retroreflective element (hereinafter, may also be called as a quadrilateral cube-corner element or a quadrilateral element) pairs each formed by a pair of quadrilateral elements, in which each of the quadrilateral elements has reflective lateral surfaces including two trapezoidal reflective lateral surfaces and one pentagonal or isosceles-triangular reflective lateral surface, has a projection shape of a quadrangular when projected onto a common plane, and shares one side (DE or AB) of the pentagonal or isosceles-triangular reflective lateral surface of the quadrilateral element with the other one in the pair and that exhibits an excellent entrance angle characteristic and rotation angle characteristic.

FIG. 1 is a perspective view for illustrating an element of a cube-corner retroreflective article according to a conventional technique and this invention.

In FIG. 1, reflective lateral surfaces of a cube-corner element includes two trapezoidal reflective lateral surfaces (HAFC and HBGC) and one pentagonal (HADEB) reflective lateral surface. A projection shape of the cube-corner element onto a common plane is of a rectangle (FGPQ).

In the invention, a length a1 (rDK) and a length a2 (rEK) may be different from each other or may be the same as each other. However, the lengths are preferably the same as each other from perspectives of a rotation angle characteristic and workability.

Figure 2:
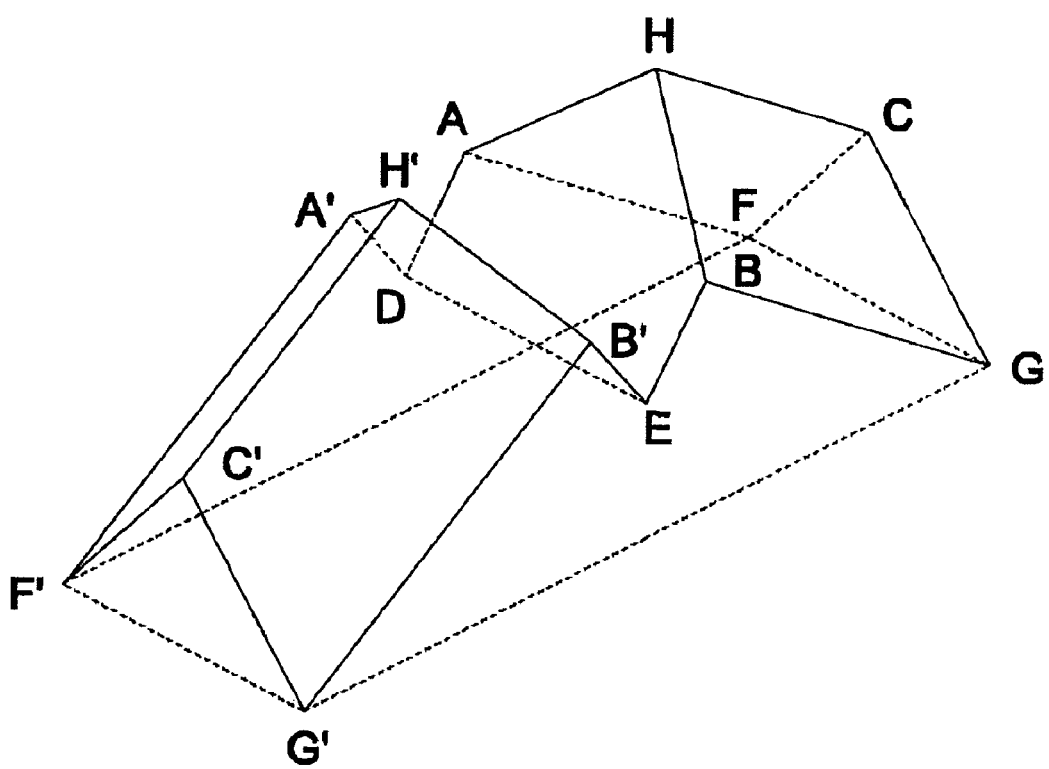
FIG. 2 is a perspective view for illustrating an element pair of a cube-corner retroreflective article according to the conventional technique and this invention.

FIG. 2 is a view showing an element pair formed by a pair of the cube-corner retroreflective elements shown in FIG. 1 sharing abase DE of the pentagonal (HADEB) reflective lateral surface so as to be a symmetric pair with respect to the line DE.

Figure 3:
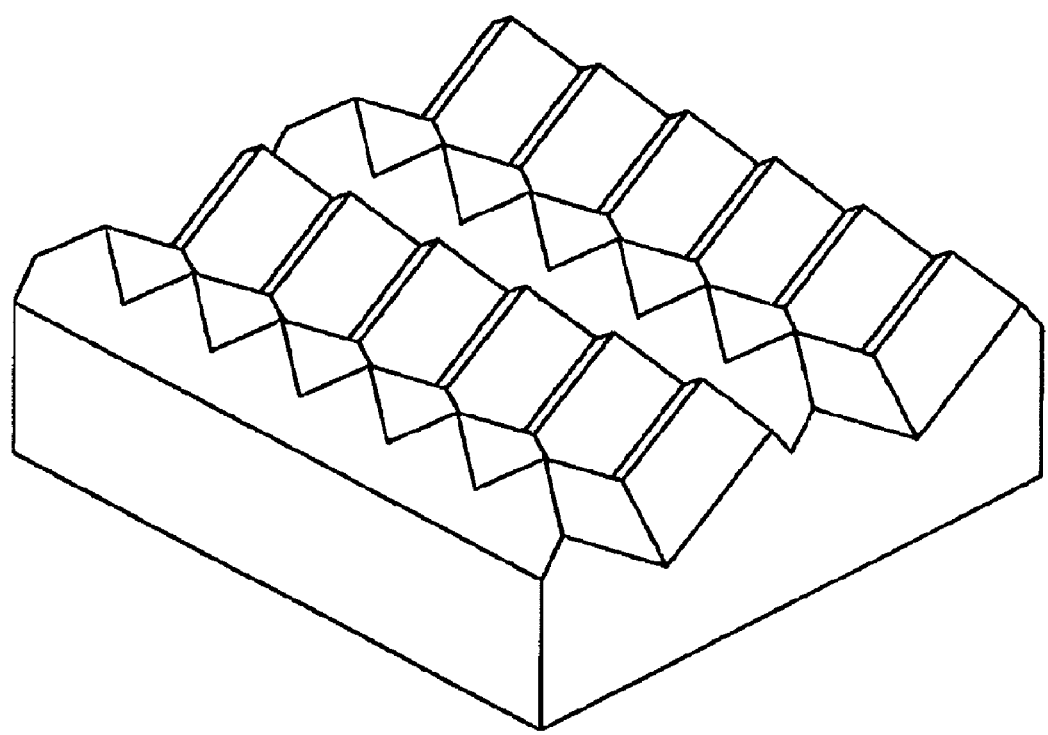
FIG. 3 is a view of a collection of the element pairs of a cube-corner retroreflective article according to the conventional technique and this invention.

FIG. 3 is a view of a collection of the cube-corner retroreflective element pairs shown in FIG. 2.

Figure 4:
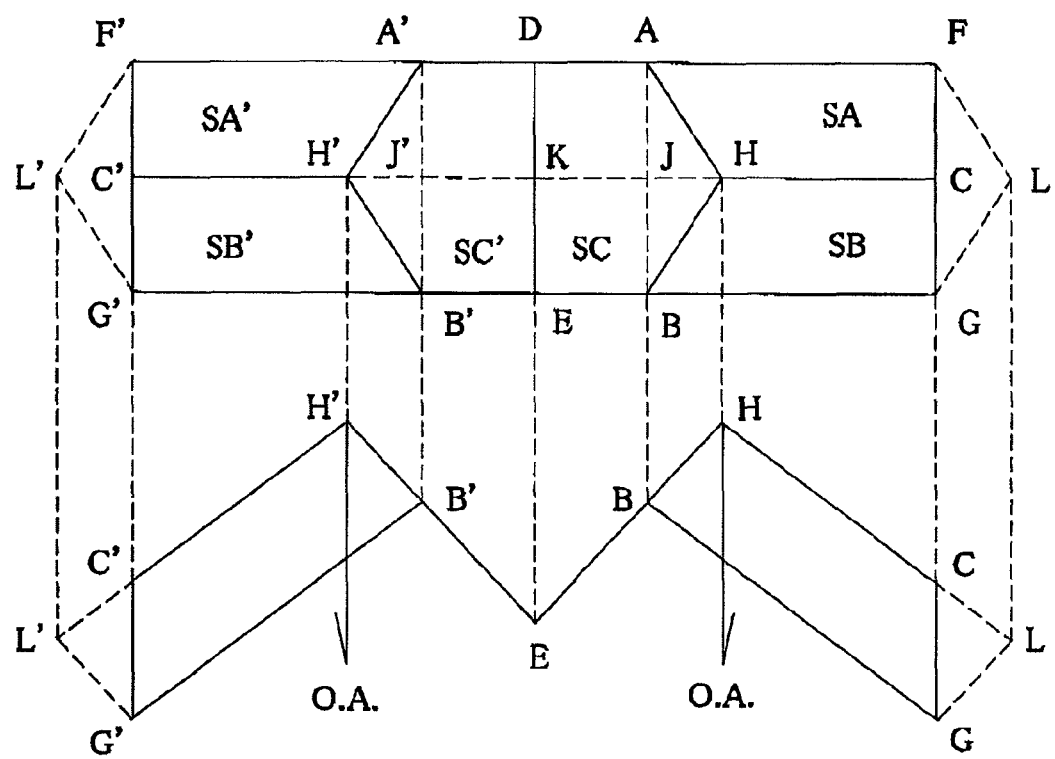
FIG. 4 includes a plan view and a side view of the element pair of a cube-corner retroreflective article according to the conventional technique and this invention.

FIG. 4 includes a plan view and a side view of the cube-corner retroreflective element pair shown in FIG. 2.

Tilt angles (θ) of optical axes of the cube-corner retroreflective element pair shown in FIG. 4 is 0 DEG. That is, the optical axis is perpendicular to the common plane.

In the invention, a ratio Sc/Sa between an area Sc of the pentagonal (HADEB) reflective lateral surface and an area Sa of the trapezoidal reflective lateral surface (HAFC) is defined by: ratios (rHA/rHC and rHB/rHC) between a length (rHC) of a ridge (HC) shared by the trapezoidal reflective lateral surfaces (HAFC and HBGC) and lengths (rHA and rHB) of the other ridges (HA and HB); and a ratio (rHK/rHC) between the length (rHC) of the ridge (HC) shared by the trapezoidal reflective lateral surfaces (HAFC and HBGC) and a length (rHK) of a perpendicular (HK) from an apex (H) of the element to the base (DE) shared by the two cube-corner elements.

In the invention, it is preferable that the ratio: Sc/Sa is close to 1 (one) because a reflective efficiency can be thereby improved. In the invention, Sc/Sa is preferably in a range of 0.6 to 1.4, more preferably in a range of 0.95 to 1.05, and further preferably in a range of 0.97 to 1.03 because the retroreflective efficiency can be further improved.

In the invention, the entrance angle characteristic and the rotation angle characteristic can be improved by adjusting the ratio (rHK/rHC). In the invention, the ratio is preferably in a range of 0.55 to 1.8. When the ratio is set in a range of 0.65 to 1.65, and further in a range of 0.8 to 1.4, the entrance angle characteristic and the rotation angle characteristic can be improved in a balanced manner.

Figure 5:
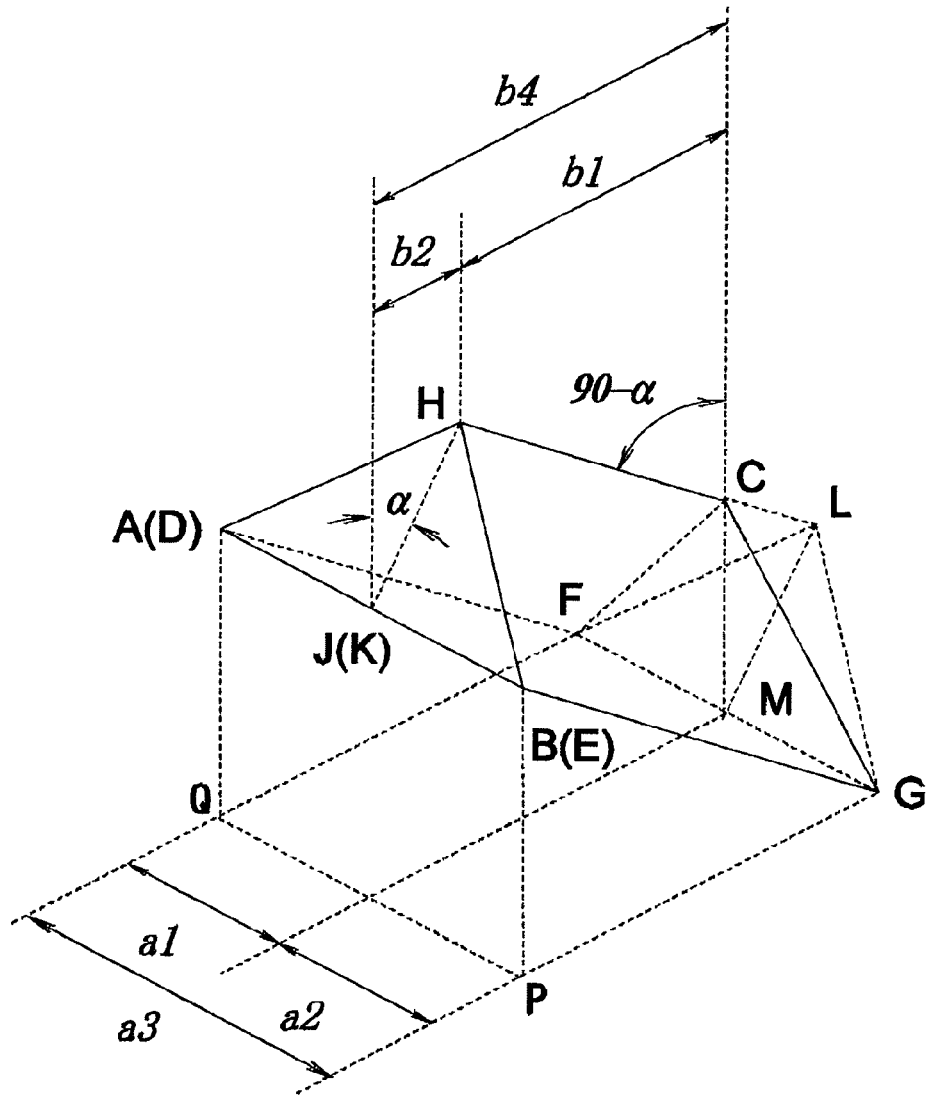
FIG. 5 is a perspective view of an element of a cube-corner retroreflective article according to the invention.

FIG. 5 is a perspective view of an element of a cube-corner retroreflective article of the invention.

FIG. 5 shows a case where the line DE matches with a line AB in FIG. 1 and reflective lateral surfaces of the cube-corner element includes two trapezoidal reflective lateral surfaces and one isosceles-triangular reflective lateral surface. In the invention, a length a1 (rDK) and a length a2 (rEK) may be different from each other or may be the same as each other. However, the lengths are preferably the same as each other from perspectives of the rotation angle characteristic and the workability.

Figure 6:
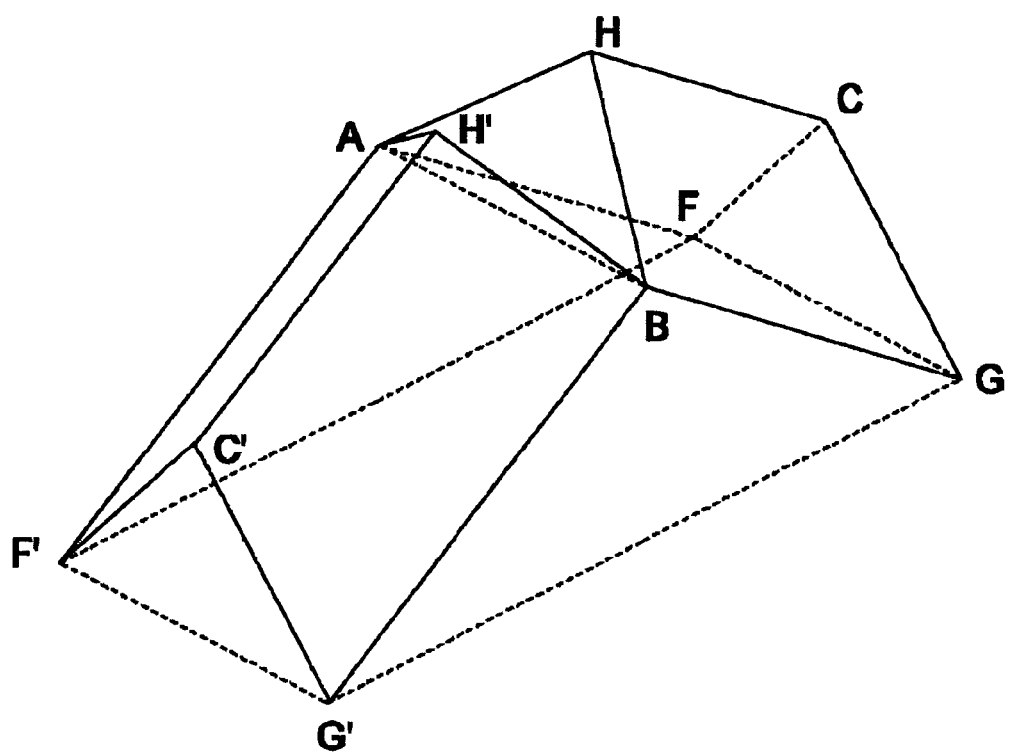
FIG. 6 is a perspective view of an element pair of a cube-corner retroreflective article according to the invention.

FIG. 6 is a view showing an element pair formed by a pair of the cube-corner retroreflective elements shown in FIG. 5 sharing a line DE (AB) so as to be a symmetric pair with respect to the line DE (AB).

Figure 7:
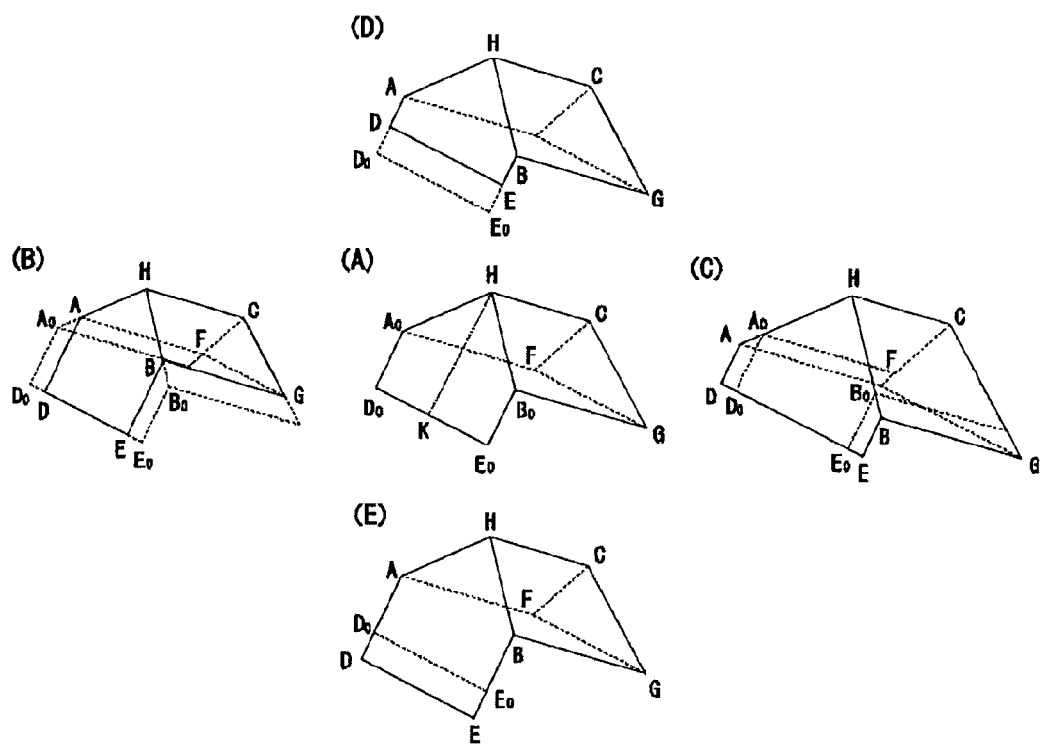
FIG. 7 is a view for illustrating ratios rHA/rHC and rHK/rHC.

FIG. 7 is a view for illustrating a ratio rHA/rHC between a length rHA and a length rHC and a ratio rHK/rHC between a length rHK and the length rHC in the invention.

FIG. 7A shows an embodiment in which lines (HA, HB, HC, and HK) have the same length. That is, the embodiment satisfies the following relations; the ratio rHK/rHC=1; and the ratio rHA/rHC=1.

In FIG. 7, FIG. 7A is used as a reference, FIGS. 7B and 7C are for illustrating the ratio rHA/rHC, and FIGS. 7D and 7E are for illustrating the ratio rHK/rHC in the invention, a ratio Sc/Sa between an area Sc and an area Sa is preferably in a range of 0.6 to 1.4, more preferably in a range of 0.95 to 1.05, and further preferably in a range of 0.97 to 1.03 from a standpoint of improving the retroreflective efficiency. In the invention, the ratio Sc/Sa can be adjusted by adjusting the ratio rHK/rHC and more specifically, the ratio Sc/Sa can be increased by increasing the ratio rHK/rHC and the ratio Sc/Sa can be decreased by decreasing the ratio rHK/rHC.

In FIG. 7B, a line HA is made shorter than a line $HA_0$ so that the ratio rHA/rHC is made smaller than 1 (one) and in FIG. 7C, the line HA is made longer than the line $HA_0$ so that the ratio rHA/rHC is made larger than 1 (one).

In FIG. 7D, a line HD is made shorter than a line $HD_0$ so that the ratio rHK/rHC is made smaller and in FIG. 7E, the line HD is made longer than the line $HD_0$ so that the ratio rHK/rHC is made larger.

In the invention, the ratio rHA/rHC and the ratio rHK/rHC can be adjusted as shown in FIG. 7 and the ratio rHA/rHC is preferably in a range of 0.5 to 1.5 and more preferably in a range of 0.7 to 1.3, the ratio rHK/rHC is preferably in a range of 0.55 to 1.8 and more preferably in a range of 0.65 to 1.65, and the ratio Sc/Sa is preferably in a range of 0.6 to 1.4, more preferably in a range of 0.95 to 1.05, and further preferably in a range of 0.97 to 1.03.

FIGS. 8A to 8E respectively include plan views and side views of the cube-corner retroreflective element pairs shown in FIGS. 7A to 7E.

Figure 8:
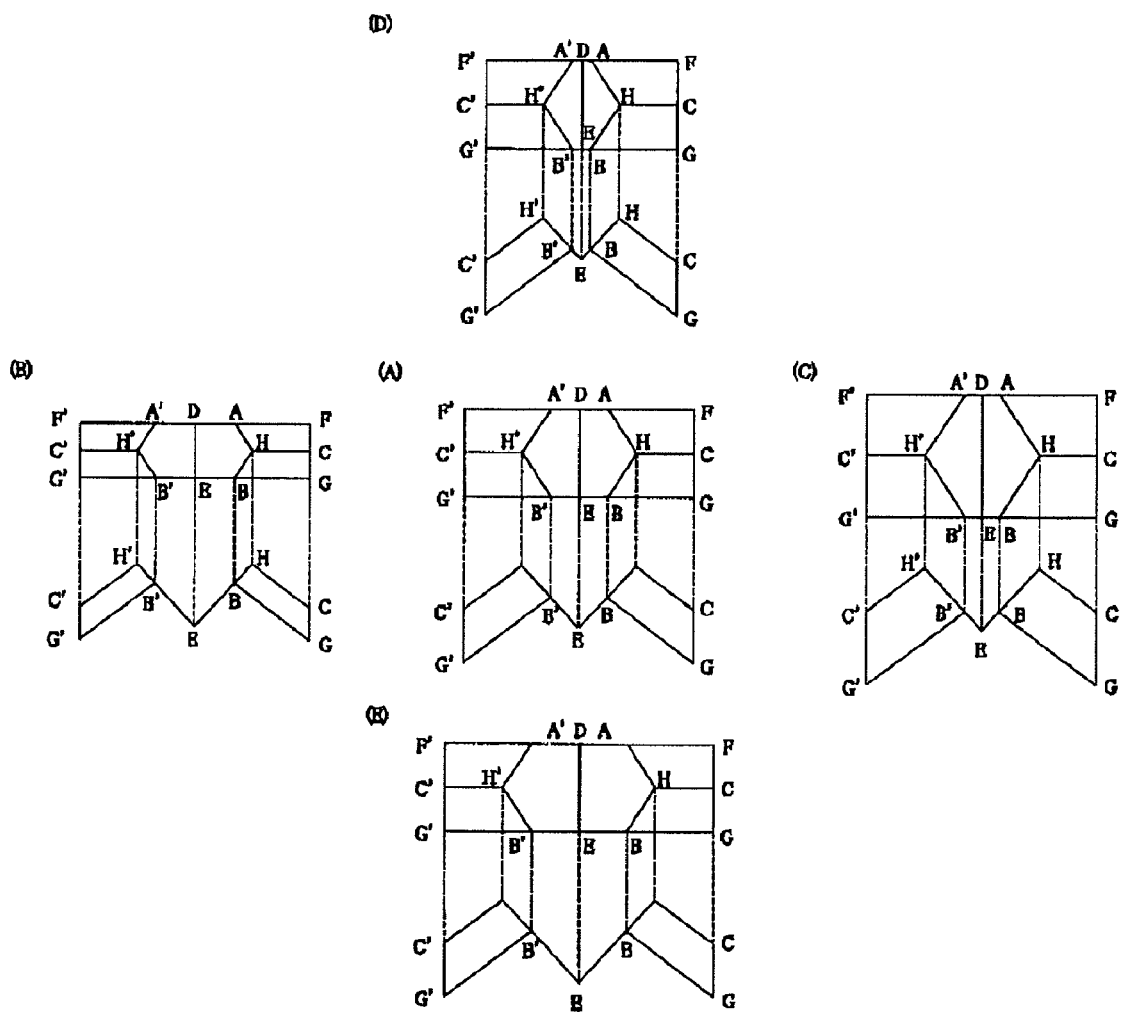
FIG. 8 is a view for illustrating the ratios rHA/rHC and rHK/rHC.

In FIG. 8, FIG. 8A is used as a reference; FIGS. 8B and 8C are for illustrating the ratio rHA/rHC, and FIGS. 8D and 8E are for illustrating the ratio rHK/rHC. In the invention, the ratio Sc/Sa is preferably in a range of 0.6 to 1.4, more preferably in a range of 0.95 to 1.05, and further preferably in a range of 0.97 to 1.03 from a standpoint of improving the retroreflective efficiency. In the invention, the ratio Sc/Sa can be adjusted by adjusting the ratio rHK/rHC and more specifically, the ratio Sc/Sa can be increased by increasing the ratio rHK/rHC and the ratio Sc/Sa can be decreased by decreasing the ratio rHK/rHC.

In FIG. 8B, the line HA in FIG. 8B is made shorter than the line HA in FIG. 8A so that the ratio rHA/rHC is made smaller than 1 (one) and in FIG. 8C, the line HA in FIG. 8C is made longer than the line HA in FIG. 8A so that the ratio rHA/rHC is made larger than 1 (one).

In FIG. 8D, the line HK in FIG. 8D is made shorter than the line HK in FIG. 8A so that the ratio rHK/rHC is made smaller and in FIG. 8E, the line HK in FIG. 8E is made longer than the HK in FIG. 8A so that the ratio rHK/rHC is made larger.

In the invention, the ratio rHA/rHC and the ratio rHK/rHC can be adjusted as shown in FIG. 8 and the ratio rHA/rHC is preferably in a range of 0.5 to 1.5 and more preferably in a range of 0.7 to 1.3, the ratio rHK/rHC is preferably in a range of 0.55 to 1.8 and more preferably in a range of 0.65 to 1.65, and the ratio Sc/Sa is preferably in a range of 0.6 to 1.4, more preferably in a range of 0.95 to 1.05, and further preferably in a range of 0.97 to 1.03.

FIGS. 9 to 12 respectively include plan views and side views of cube-corner retroreflective element pairs according to the invention.

Figure 9:
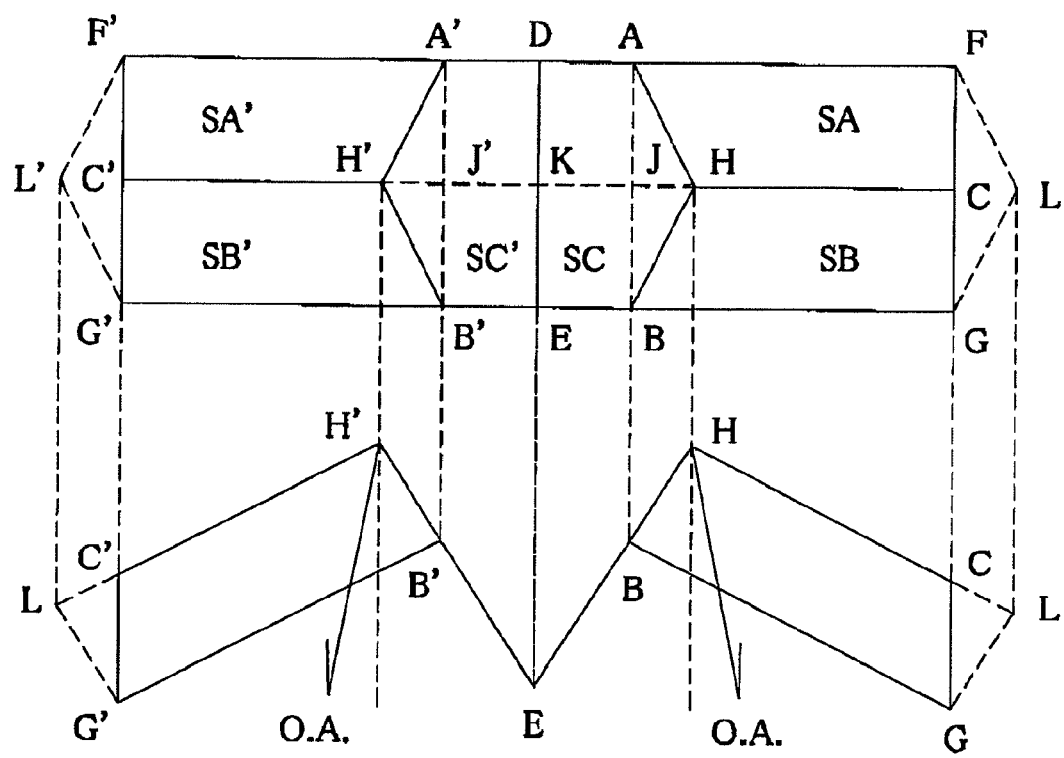
FIG. 9 includes a plan view and a side view of a cube-corner retroreflective element pair according to the invention.

In FIG. 9, a tilt angle (θ) of optical axes O.A. is positive, and an area Sa is the same as an area Sb and larger than an area Sc.

Figure 10:
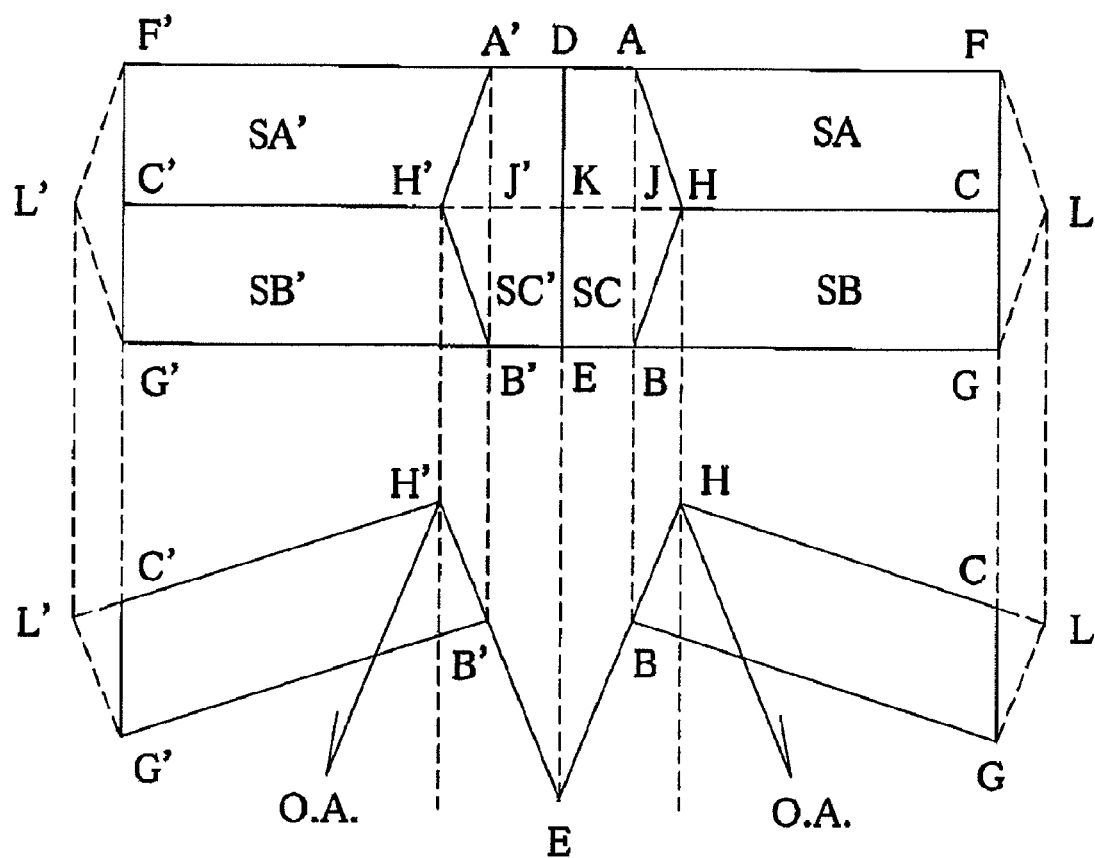
FIG. 10 includes a plan view and a side view of a cube-corner retroreflective element pair according to the invention.

In FIG. 10, a tilt angle (θ) of optical axes O.A. is more positive than θ in FIG. 9, and a ratio of an area Sc to an area Sa is smaller than that in FIG. 9.

Figure 11:
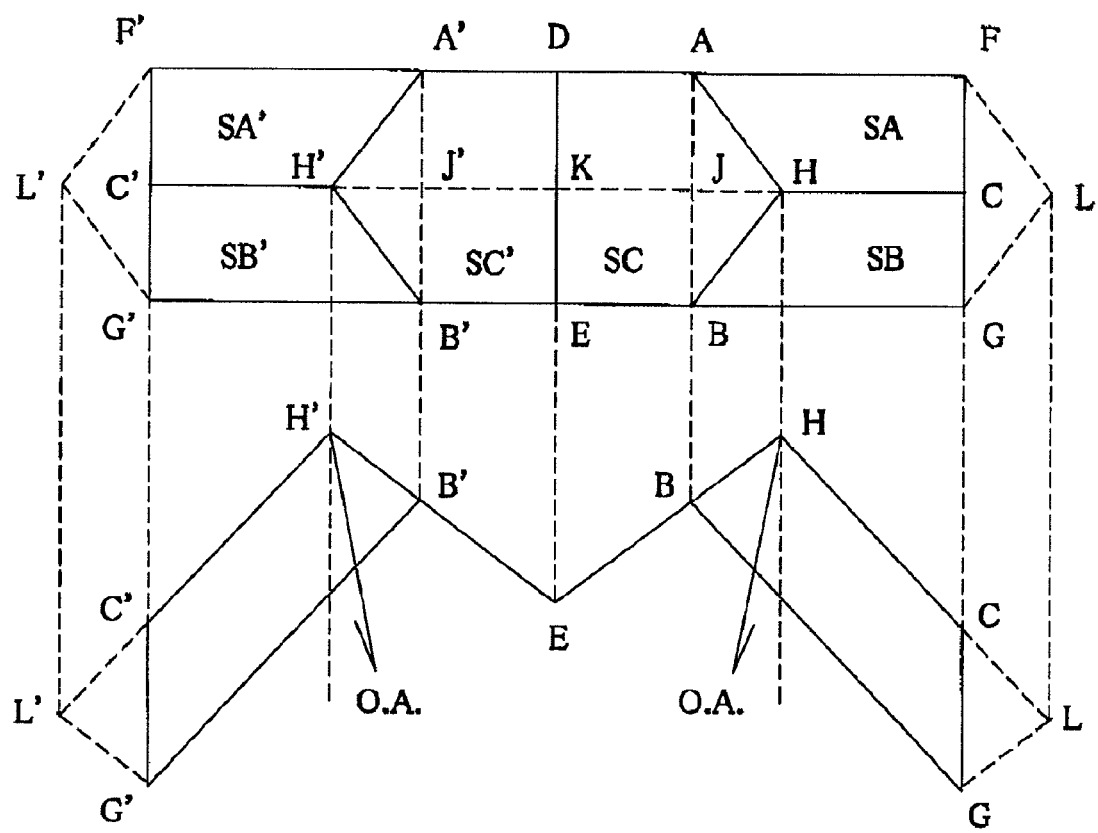
FIG. 11 includes a plan view and a side view of a cube-corner retroreflective element pair according to the invention.

In FIG. 11, a tilt angle (θ) of optical axes O.A. is negative, an area Sa is the same as an area Sb and larger than an area Sc, and an area ratio between the area Sa and the area Sc is approximately 1 (one).

Figure 12:
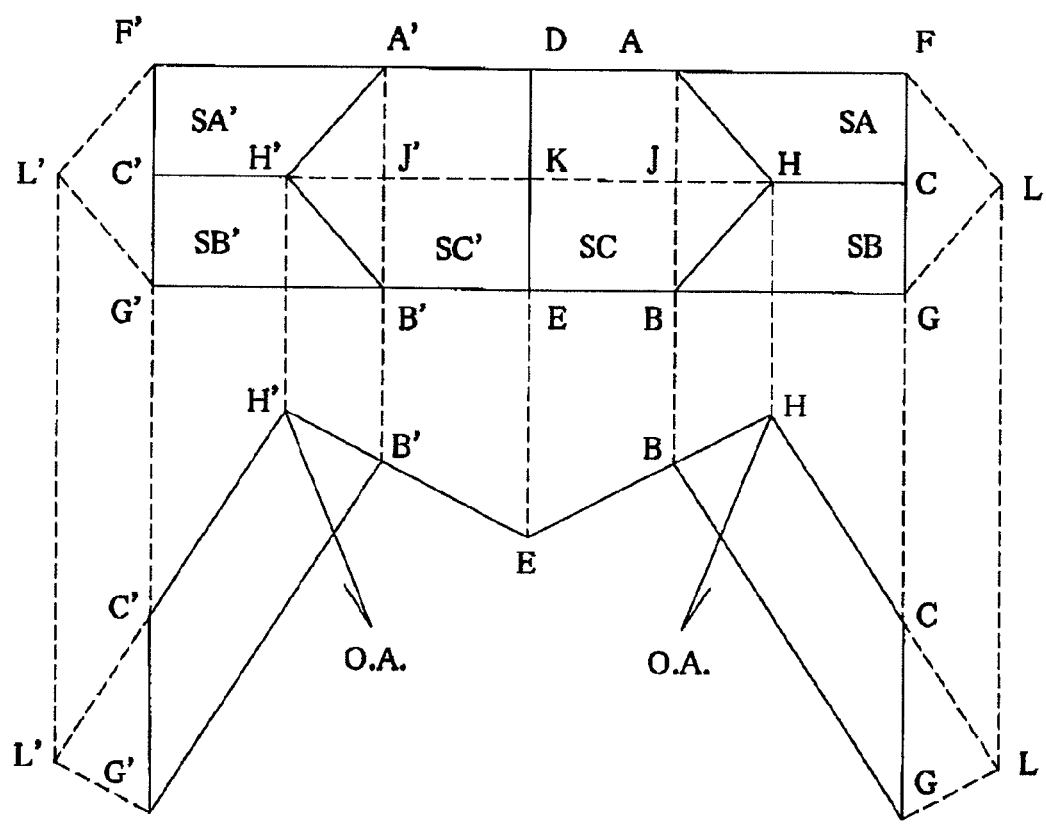
FIG. 12 includes a plan view and a side view of a cube-corner retroreflective element pair according to the invention.

In FIG. 12, a tilt angle (θ) of optical axes O.A. is more negative than θ in FIG. 11 and an area Sc is the same as an area Sa.

Next, other preferable embodiments of a cube-corner retroreflective article according to the invention will be described referring to the drawings.

The invention relates to a cube-corner retroreflective article that is provided with a number of cube-corner retroreflective element pairs each formed by a pair of cube-corner retroreflective elements sharing one side (DE) so as to be a symmetric pair, each of the cube-corner retroreflective elements having reflective lateral surfaces including two trapezoidal reflective lateral surfaces (HAFC and HBGC) and one pentagonal or triangular reflective lateral surface (HADEB or HAS), and having a projection shape of a rectangle when projected onto a common plane, wherein an optical axis of the cube-corner retroreflective element tilts in a direction parallel to the shared side (DE), that exhibits an excellent entrance angle characteristic and rotation angle characteristic.

The invention more particularly relates to the cube-corner retroreflective article, wherein two optical axes of the cube-corner retroreflective element pair tilt in both directions parallel to the shared side (DE) and perpendicular thereto.

Figure 13:
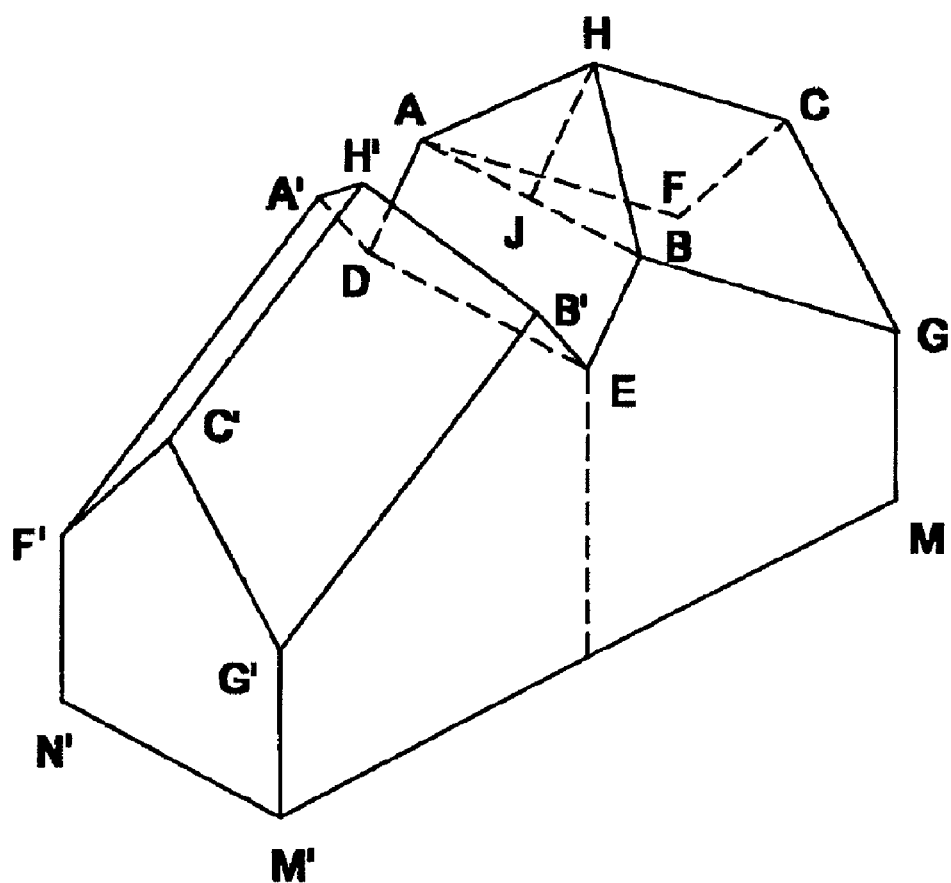
FIG. 13 is a perspective view for illustrating elements of a cube-corner retroreflective article according to a conventional technique and this invention.

FIG. 13 is a perspective view for illustrating an element of a cube-corner retroreflective article according to a conventional technique and this invention.

In FIG. 13, reflective lateral surfaces of a cube-corner element includes two trapezoidal reflective lateral surfaces (HAFC and HBGC) and one pentagonal reflective lateral surface (HADEB). Two cube-corner retroreflective elements form a symmetric pair with respect to a shared side (DE).

The trapezoidal reflective lateral surface HAFC is referred to as a reflective lateral surface SA, the trapezoidal reflective lateral surface HBGC is referred to as a reflective lateral surface SB, and the pentagonal reflective lateral surface HADBE is referred to as a reflective lateral surface SC. Regarding to side surfaces respectively forming pairs with the side surfaces as described above, a trapezoidal reflective lateral surface H'A'F'C' is referred to as a reflective lateral surface SA', a trapezoidal reflective lateral surface H'B'G'C' is referred to as a reflective lateral surface SB', a pentagonal reflective lateral surface H'A'DES' is referred to as a reflective lateral surface SC'.

Figure 14:
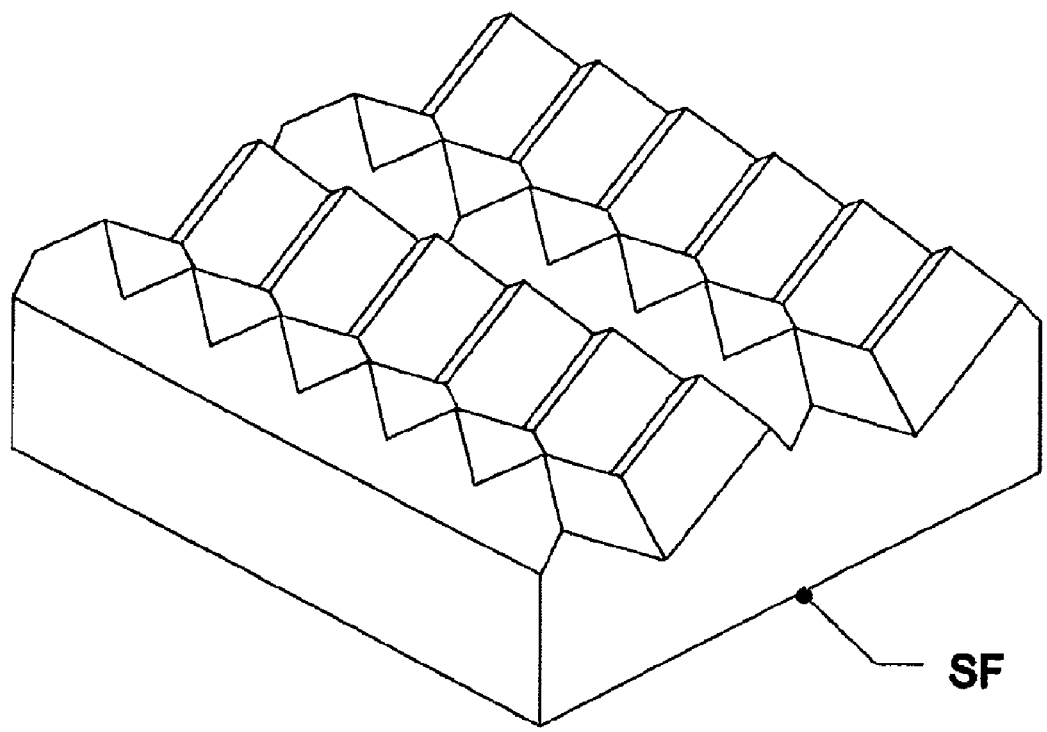
FIG. 14 is a perspective view for illustrating a collection of element pairs of a cube-corner retroreflective article of the conventional technique and this invention.

FIG. 14 is a view of a collection of the cube-corner retroreflective element pairs according to the conventional technique shown in FIG. 13. An incident light entering from an incident surface at bottom of the figure is reflected by the reflective lateral surfaces (SA, SB and SC) of the reflective element and then retroreflected toward a direction of a light source. In the invention, a common plane is a virtual plane parallel to the incident surface (SF).

Figure 15:
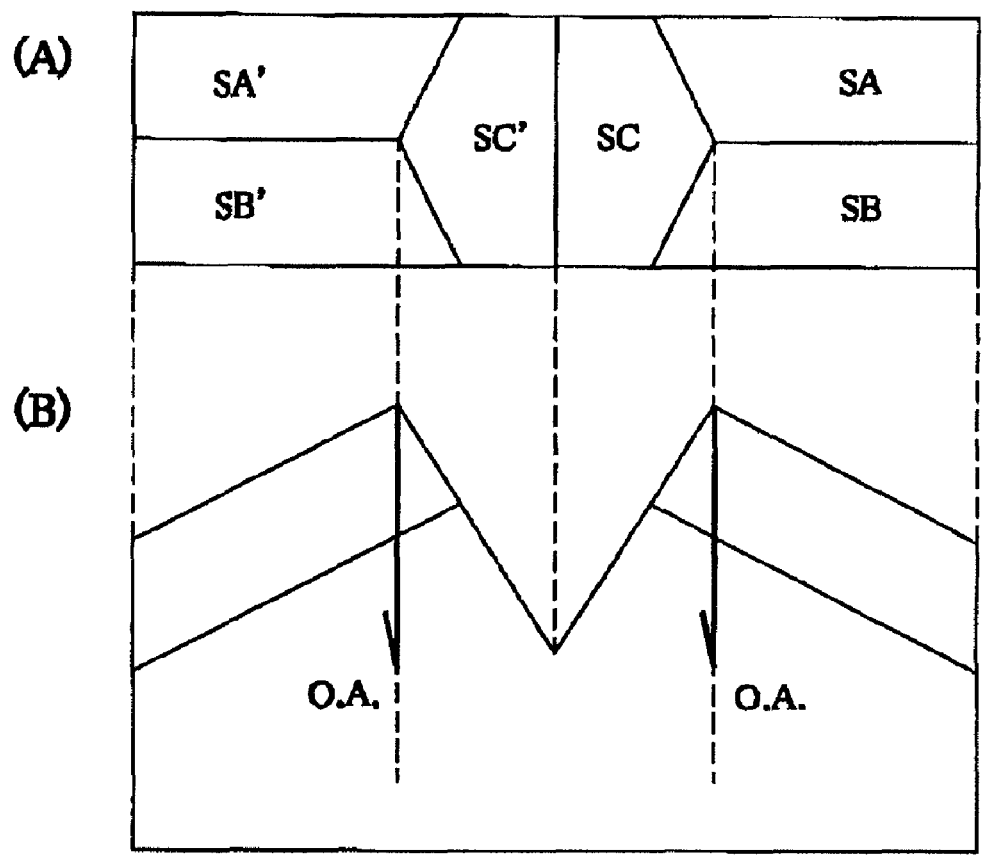
FIG. 15 includes a plan view and a side view of a cube-corner retroreflective element pair according to the conventional technique and this invention.

FIG. 15 includes a plan view (A) and a side view (B) of a cube-corner retroreflective element pair according to the conventional technique shown in FIG. 14. In the figure, optical axes are shown as O.A.

A tilt angle (θ) of the optical axes O.A. of the cube-corner retroreflective element pair shown in FIG. 15 is perpendicular to a common plane and the optical axes O.A. do not tilt.

Figure 16:
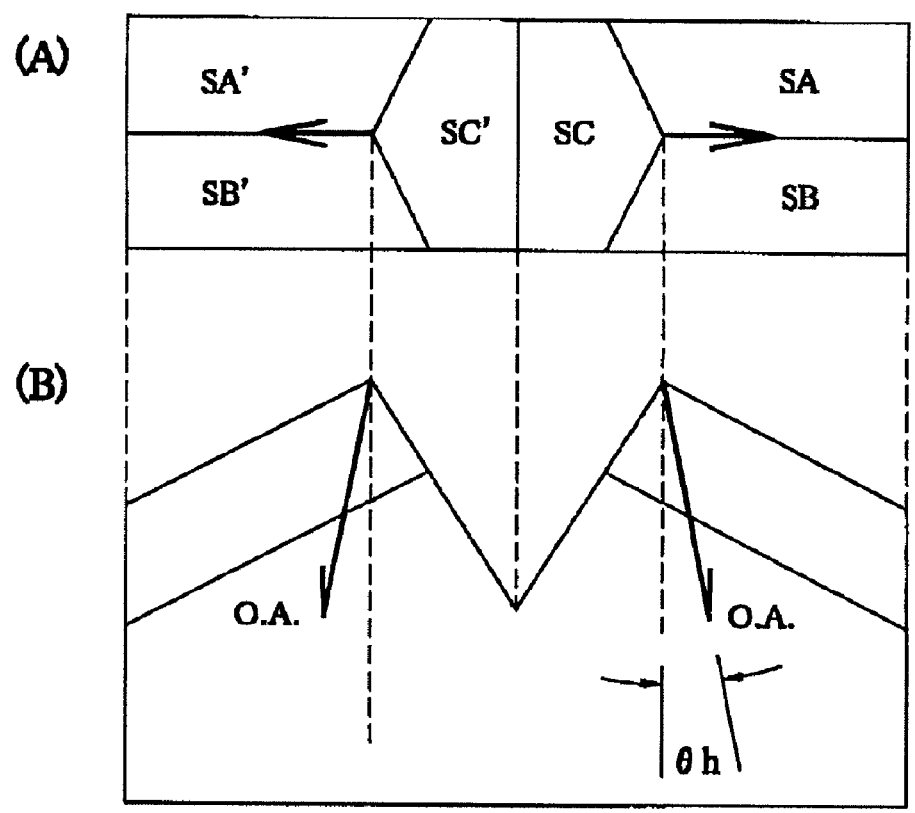
FIG. 16 includes a plan view and a side view of an element pair of a cube-corner retroreflective article according to the conventional technique and this invention.

FIG. 16 includes a plan view (A) and a side view (B) of another cube-corner retroreflective element pair as shown in FIG. 14. In the figure, optical axes are shown as O.A.

The optical axes of the cube-corner retroreflective element pair shown in FIG. 16 tilt θh with respect to a perpendicular line to the common plane in a direction perpendicular to the shared side (DE). Regarding to the tilt direction of the optical axes, the optical axes can tilt in left direction or right direction in the figure. However, it is preferable that two optical axes of an element pair forming a pair tilt in opposite directions because the entrance angle characteristic can be thereby improved.

Figure 17:
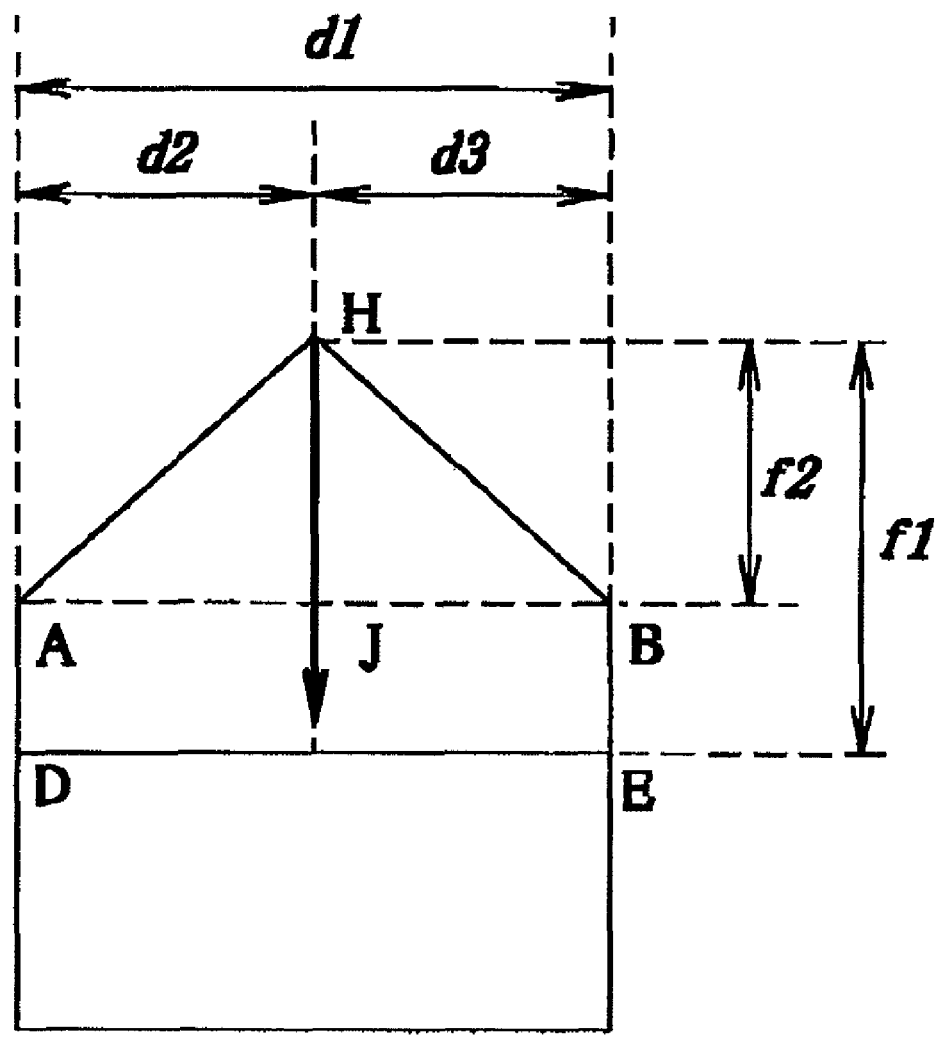
FIG. 17 is a side view of the element pair of a cube-corner retroreflective article according to the conventional technique and this invention.

FIG. 17 is a side view of the cube-corner retroreflective element according to the conventional technique as shown in FIGS. 15 and 16 viewed from a plane perpendicular to the reflective lateral surface HADEB.

In the embodiment shown in FIG. 17, a height f2 from H to a plane including A and B is smaller than a height f1 from H to the shared side (DE), and d2 and d3 are the same.

In the embodiment shown in FIG. 17, relations that a length of a side HA=a length of aside HB and that the height f1=the height f2 may be satisfied, the sides HA and HB may have different lengths, an apex A may be the same as an apex D or an apex B may be the same as an apex E, and the pentagon HADEB may be a triangle or a quadrangle.

Figure 18:
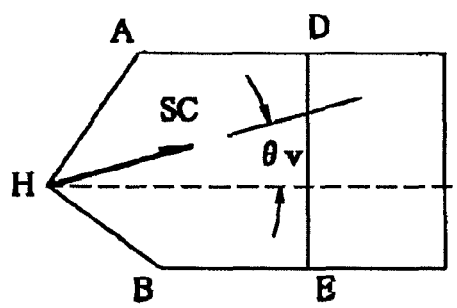
FIG. 18 includes a plan view and a side view of a cube-corner retroreflective element pair according to the invention.
Figure 18:
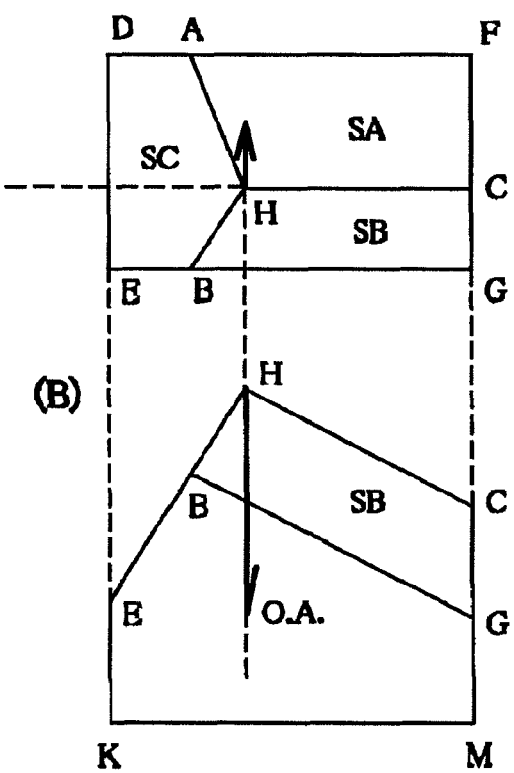

FIG. 18 shows a cube-corner retroreflective element according to the invention.

FIG. 18 includes plan views (A) and (C) and a side view (B) of the cube-corner retroreflective element pair. In the figure, an optical axis is shown as O.A. In the embodiment shown in FIG. 18, the optical axis tilts only in a direction parallel to a side (DE) and a horizontal tilt angle (θv) that is a component, which is parallel to the shared side (DE), of the tilt angle (θ) of the optical axis is shown.

Figure 19:
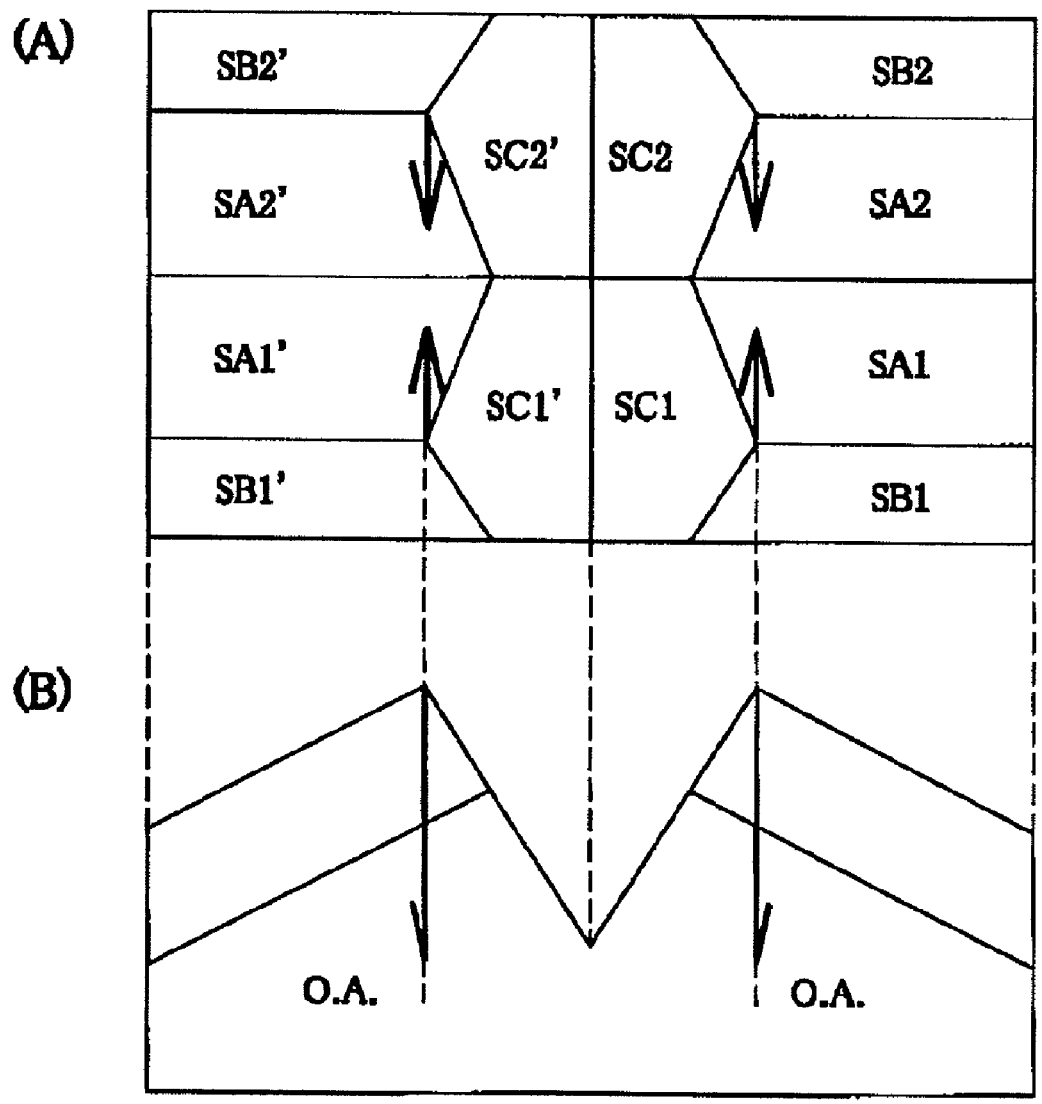
FIG. 19 includes a plan view and a side view of cube-corner retroreflective element pairs according to the invention.

FIG. 19 shows cube-corner retroreflective element pairs according to the invention.

FIG. 19 includes a plan view and a side view of the cube-corner retroreflective element pairs shown in FIG. 18. FIG. 19 shows an embodiment in which two optical axes of each of the element pairs tilt in the same direction that is parallel to the shared side (DE) of the element pair, and two optical axes of each of the element pairs adjacent to one of the element pairs in an extending direction of the shared side (DE) tilt in opposite direction to those of the one of the element pairs.

In the invention, it is preferable that two optical axes of the element pair tilt in the same direction that is parallel to the shared side (DE), and two optical axes of each of the element pairs adjacent to one of the element pairs in an extending direction of the shared side (DE) tilt in opposite direction to those of the one of the element pairs because a cube-corner retroreflective article can be easily manufactured and the entrance angle characteristic and the rotation angle characteristic can be easily improved.

In the embodiment shown in FIG. 19, element pairs having optical axes tilting in the same direction and in the opposite direction are alternately arranged, however, the way of arrangement is not particularly limited and one or two element(s) having optical axes tilting in the same direction and one or two element(s) having optical axes tilting in the opposite direction may be alternately arranged.

When the element pairs having the optical axes tilting in the same direction are collectively arranged, a poor appearance such as glaring may be caused when a retroreflective sheeting is manufactured. Therefore, a region where such element pairs are collectively arranged is preferably made to have a dimension of 4 mm or less in a length direction, more preferably made to have a dimension of 2 mm or less, and further preferably made to have a dimension of 1 mm or less in the invention.

Figure 20:
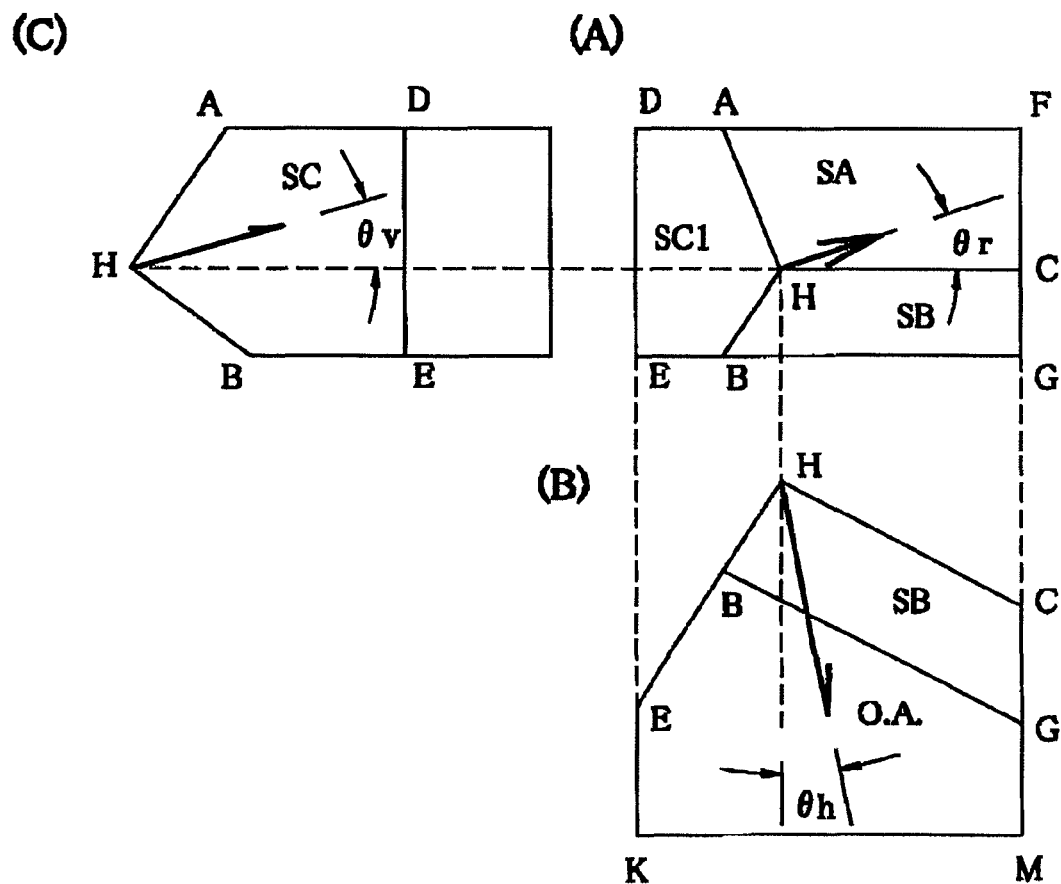
FIG. 20 includes a plan view and a side view of a cube-corner retroreflective element pair according to the invention.

FIG. 20 shows a cube-corner retroreflective element pair according to the invention.

FIG. 20 includes plan views (A) and (C) and a side view (B) of the tube-corner retroreflective element pair. In the figure, an optical axis is shown as D.A. FIG. 20 shows: a horizontal tilt angle (θv) that is a component, which is parallel to a shared side (DE), of a tilt angle (θ) of the optical axis; an angle (θr) between a side (HC) and the optical axis when the tilt angle (θ) of the optical axis is projected onto a common plane; and a horizontal tilt angle (θh) that is a component, which is perpendicular to the shared side (DE), of the tilt angle (θ) of the optical axis.

In the invention, it is preferable that two optical axes of the cube-corner retroreflective element pair tilt in both directions parallel to the shared side (DE) and perpendicular to the shared side (DE) because the entrance angle characteristic and the rotation angle characteristic can be further improved.

Figure 21:
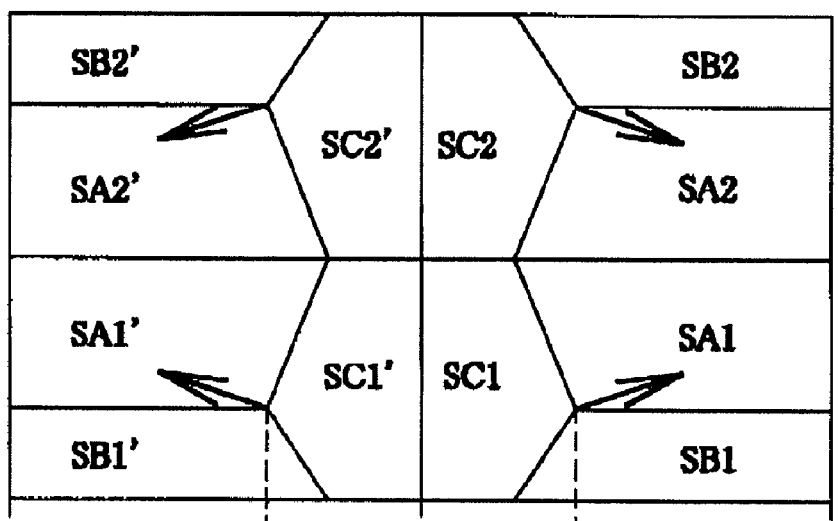
FIG. 21 includes a plan view and a side view of cube-corner retroreflective element pairs according to the invention.
Figure 21:
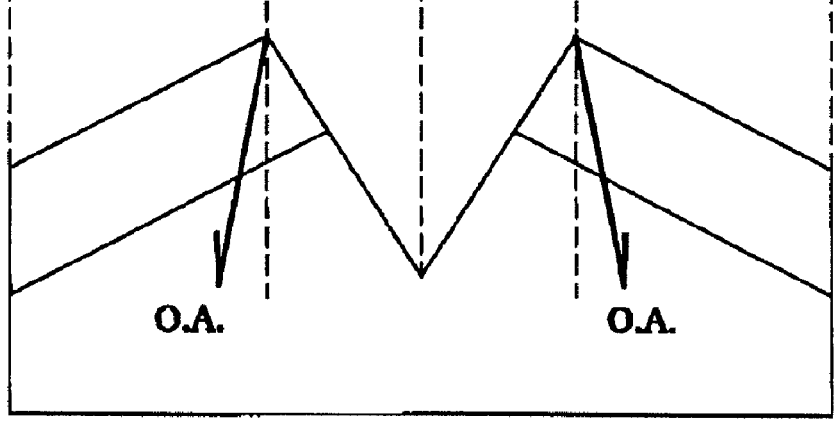

FIG. 21 shows cube-corner retroreflective element pairs according to the invention.

FIG. 21 includes a plan view and side view of the cube-corner retroreflective element pairs shown in FIG. 20. FIG. 21 shows an embodiment in which two optical axes of each of the element pairs tilt in the same direction that is parallel to the shared side (DE) of the element pair, and two optical axes of each of the element pairs adjacent to one of the element pairs in an extending direction of the shared side (DE) tilt in opposite direction to those of the one of the element pairs.

In the invention, it is preferable that two optical axes of the element pair tilt in both directions parallel to the shared side (DE) and perpendicular to the shared side (DE) and two optical axes of each of the element pairs adjacent to one of the element pairs in an extending direction of the shared side (DE) tilt in opposite direction to those of the one of the element pairs because a cube-corner retroreflective article can be easily manufactured and the entrance angle characteristic and the rotation angle characteristic can be easily improved.

Figure 22:
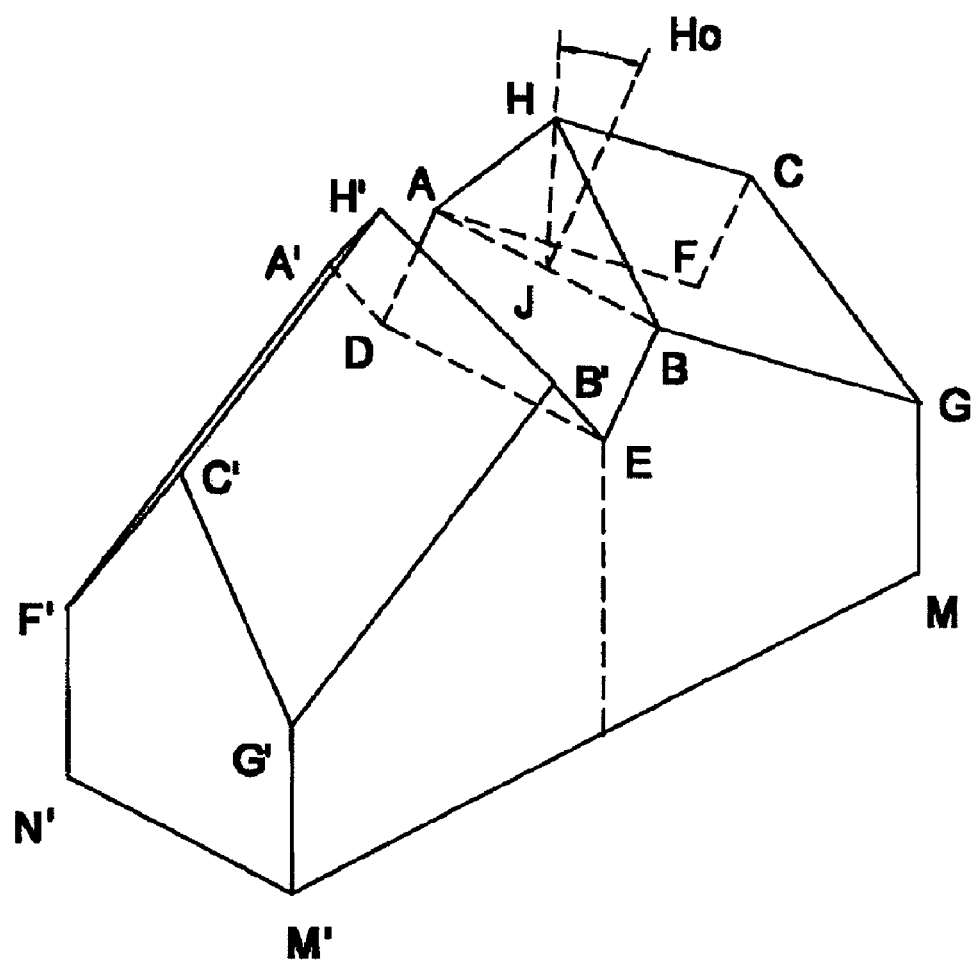
FIG. 22 is a perspective view for illustrating an element of a cube-corner retroreflective article according to the invention.

FIG. 22 is a perspective view of the cube-corner element pair shown in FIGS. 19 and 21.

In FIG. 22, the optical axes of the cube-corner elements according to the invention are in a direction parallel to the side DE and an apex H shifts rightward whereas optical axes of cube-corner elements according to the conventional technique tilt in a direction perpendicular to the side DE.

Figure 23:
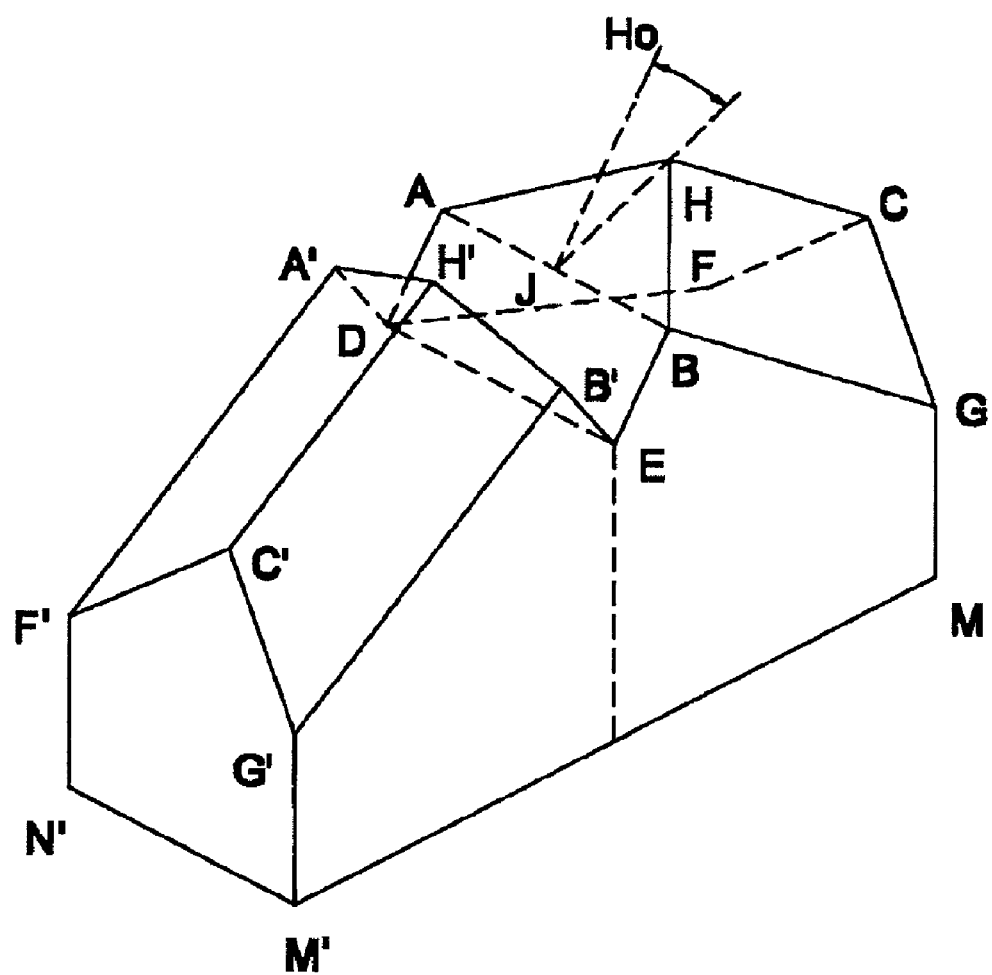
FIG. 23 is a perspective view for illustrating an element of a cube-corner retroreflective article according to the invention.

FIG. 23 is a perspective view of the cube-corner element pair as show in FIGS. 19 and 21.

In FIG. 23, the optical axes of the cube-corner elements according to the invention are in a direction parallel to the side DE and an apex H shifts rightward whereas optical axes of cube-corner elements according to the conventional technique tilt in a direction perpendicular to the side DE.

Figure 24:
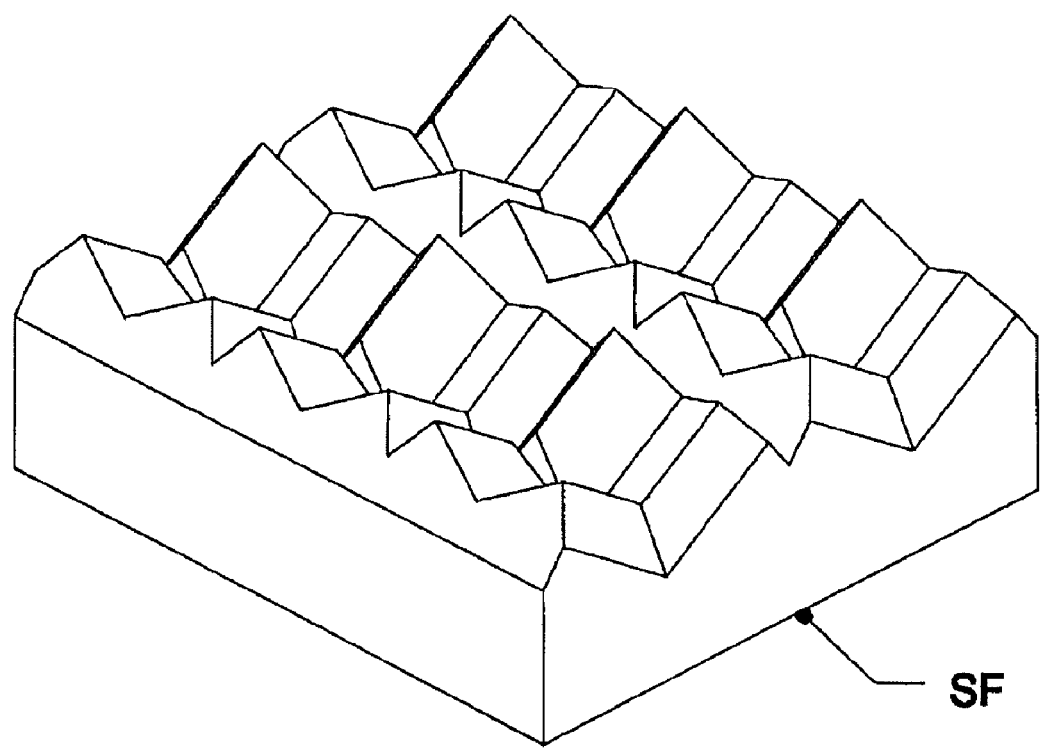
FIG. 24 is a perspective view for illustrating a collection of the element pairs of a cube-corner retroreflective article according to the invention.

FIG. 24 is a perspective view of a collection of the cube-corner element pairs shown in FIGS. 19 and 21.

In FIG. 24, a light incident surface is shown as SF.

Figure 25:
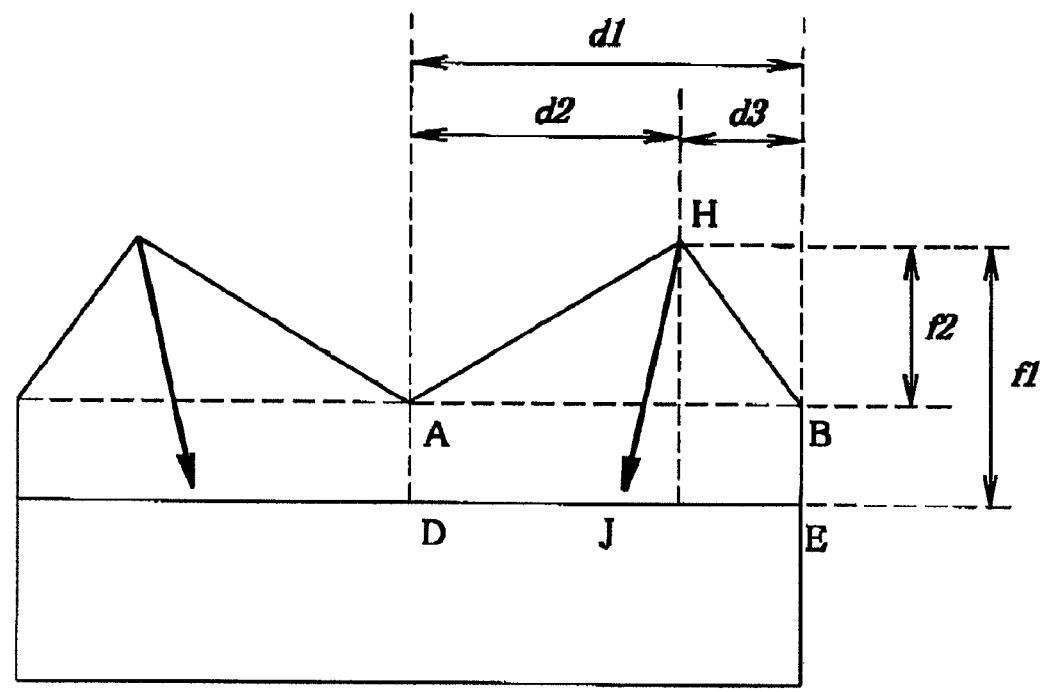
FIG. 25 is a side view of an element pair of a cube-corner retroreflective article according to the invention.

FIG. 24 shows an embodiment, in which the elements shown in FIGS. 22 and 23 are alternately arranged. FIG. 25 shows a cube-corner retroreflective element pair according to the invention.

In FIG. 25, a height from H to a plane including A and a height from an apex H to a plane including an apex B are both equally f2. In addition, a length d2 is larger than a length d3, a length of a side HA differs from a length of a side HB, and optical axes tilt.

Figure 26:
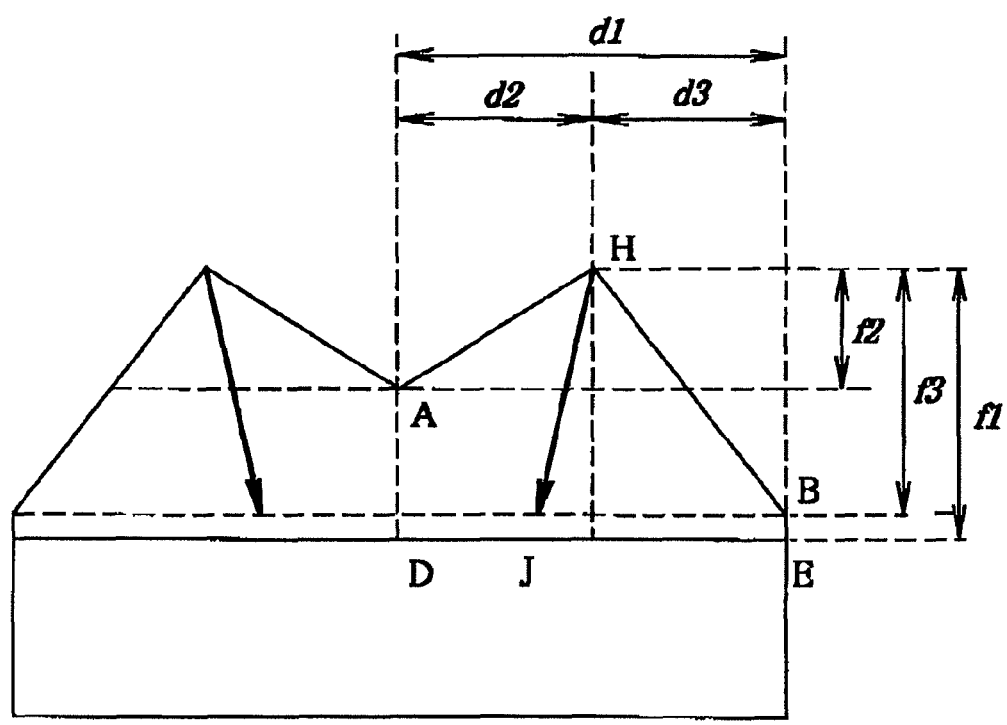
FIG. 26 is a side view of an element pair of a cube-corner retroreflective article according to the invention.

FIG. 26 shows a cube-corner retroreflective element pair according to the invention.

In FIG. 26, a height f3 from an apex H to a plane including an apex B is larger than a height f2 from H to a plane including A, a length d2 and a length d3 are the same, a length of a side HA differs from a length of a side HB, and optical axes O.A. tilt.

Figure 27:
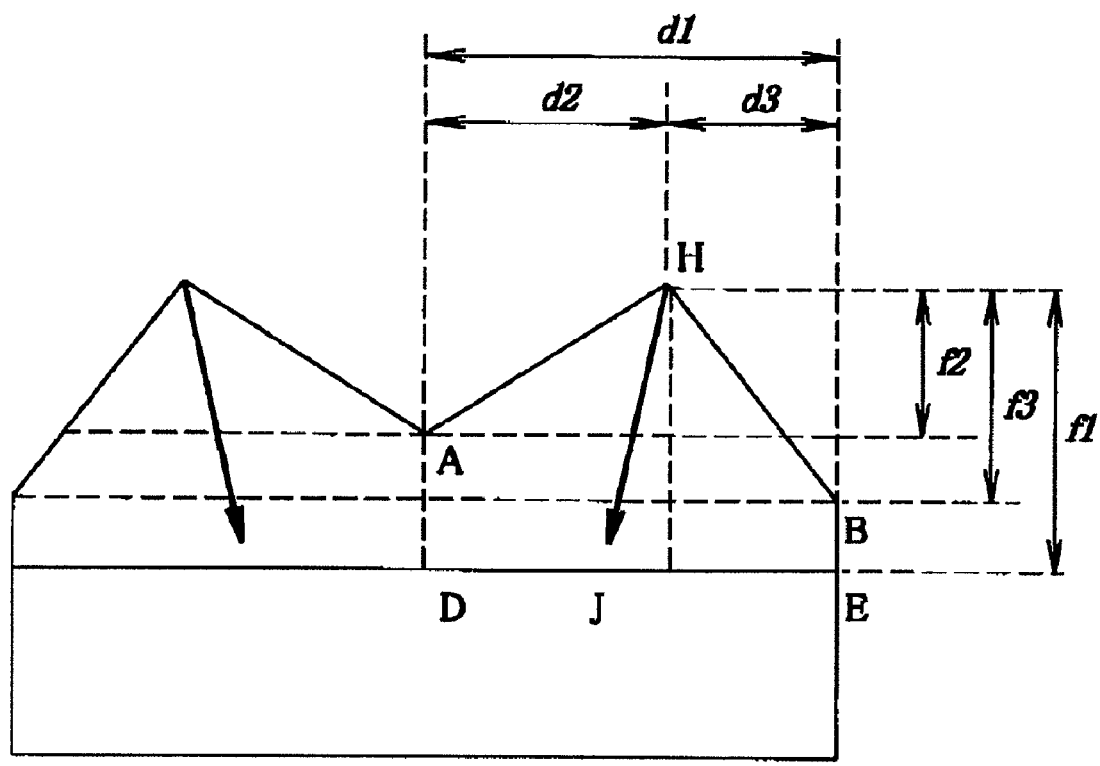
FIG. 27 is a side view of an element pair of a cube-corner retroreflective article according to the invention.

FIG. 27 shows a cube-corner retroreflective element pair according to the invention.

In FIG. 27, a height f3 from an apex H to a plane including an apex B is larger than a height f2 from H to a plane including A, a length d2 is larger than a length d3, and optical axes O.A. tilt.

In the embodiment shown in FIG. 27, a length of a side HA and a length of a side HB are the same, optical axes tilt in both directions parallel to a side DE and perpendicular to the side DE, and thus the entrance angle characteristic and the rotation angle characteristic of a brightness can be improved in a balanced manner, which makes the embodiment most preferable.

Figure 28:
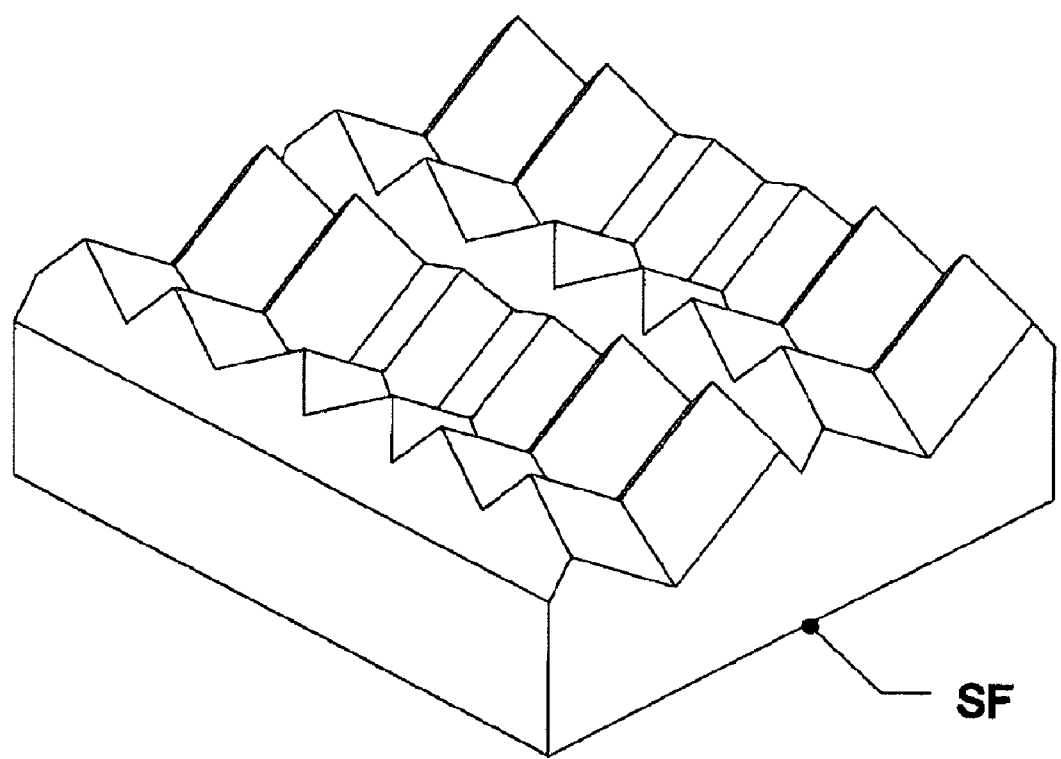
FIG. 28 is a perspective view for illustrating a collection of the element pairs of a cube-corner retroreflective article according to the invention.

FIG. 28 shows a perspective view of an embodiment of a collection of the cube-corner element pairs shown in FIGS. 19 and 21.

In the embodiment shown in FIG. 28, two of the element pairs having the optical axes tilting in the same direction and two of the element pairs having the optical axes tilting in the opposite direction are alternately arranged. A region where such element pairs are collectively arranged is preferably made to have a dimension of 4 mm or less in a length direction, more preferably made to have a dimension of 2 mm or less, and further preferably made to have a dimension of 1 mm or less in the invention. This embodiment does not cause an adverse effect on an appearance and thus is also preferable.

Hereinafter, the contents of the invention will be illustrated more specifically with examples and comparative examples; however, the invention is not limited to the examples provided below.

Examples 1 to 30

A cube-corner retroreflective article was designed using a three-dimensional CAD such that cube-corner retroreflective element pairs in shapes as shown in FIG. 6 were arranged to be closely packed in an area of 100 mm². Each of the cube-corner retroreflective element pairs was designed to have HC of 100 μm, and tilt angles of optical axes, Sc/Sa (Sc/Sb), rHA/rHC (rHB/rHC), and rHK/rHC of values shown in Table 1.

Example 31

Also, a drawing of a cube-corner retroreflective article was designed using a three-dimensional CAD similarly to Example 1 such that cube-corner retroreflective element pairs in shapes as shown in FIGS. 20 and 21 respectively have θv of 6 DEG and θr of 45 DEG.

Comparative Examples 1 and 2

A cube-corner retroreflective article was designed using a three-dimensional CAD similarly to the Example 1 except that cube-corner retroreflective element pairs in shapes as shown in FIGS. 1 and 2 were made to have tilt angles of optical axes, Sc/Sa (Sc/Sb), rHA/rHC (rHB/rHC), and rHK/rHC of values shown in Table 1.

TABLE 1

|  | Tilt angle of optical axis | Sc/Sa | HA/HC | HK/HC |
|---|---|---|---|---|
| Example 1 | −6° | 1.000 | 1.150 | 1.366 |
| Example 2 | −6° | 1.000 | 1.300 | 1.452 |
| Example 3 | −6° | 1.000 | 1.500 | 1.566 |
| Example 4 | −6° | 1.200 | 0.700 | 1.280 |
| Example 5 | −6° | 1.200 | 0.850 | 1.373 |
| Example 6 | −6° | 1.200 | 1.000 | 1.465 |
| Example 7 | −6° | 1.200 | 1.150 | 1.558 |
| Example 8 | −6° | 1.200 | 1.300 | 1.650 |
| Example 9 | −6° | 1.400 | 0.500 | 1.320 |
| Example 10 | −6° | 1.400 | 0.700 | 1.452 |
| Example 11 | −6° | 1.400 | 0.850 | 1.551 |
| Example 12 | −6° | 1.400 | 1.000 | 1.650 |
| Example 13 | −6° | 1.400 | 1.150 | 1.749 |
| Example 14 | 0° | 0.600 | 1.150 | 0.953 |
| Example 15 | 0° | 0.600 | 1.300 | 1.022 |
| Example 16 | 0° | 0.800 | 0.700 | 0.912 |
| Example 17 | 0° | 0.800 | 0.850 | 0.986 |
| Example 18 | 0° | 0.800 | 1.000 | 1.061 |
| Example 19 | 0° | 0.800 | 1.150 | 1.135 |
| Example 20 | 0° | 0.800 | 1.300 | 1.209 |
| Example 21 | 0° | 1.000 | 0.500 | 0.972 |
| Example 22 | 0° | 1.000 | 0.700 | 1.078 |
| Example 23 | 0° | 1.000 | 0.850 | 1.158 |
| Example 24 | 0° | 1.000 | 1.000 | 1.237 |
| Example 25 | 0° | 1.200 | 0.500 | 1.131 |
| Example 26 | 0° | 1.200 | 0.700 | 1.244 |
| Example 27 | 0° | 1.200 | 0.850 | 1.329 |
| Example 28 | 0° | 1.400 | 0.500 | 1.290 |
| Example 29 | 0° | 1.400 | 0.850 | 1.501 |
| Example 30 | 0° | 1.400 | 1.000 | 1.591 |
| Comparative Example 1 | −6° | 0.5 | 1.6 | 1.095 |
| Comparative Example 2 | 0° | 0.5 | 1.6 | 1.061 |

An optical simulation of calculating an illuminance on an evaluation surface was performed on each of the cube-corner retroreflective articles designed as described above. The simulation was performed in conditions where white parallel lights are used as a light source, and the evaluation surface has an area of about 0.5 m² and is positioned 10 m away from each of the cube-corner retroreflective articles. In the optical simulation, a light behavior in three-dimensional space was calculated using Monte Carlo ray-tracing in three-dimensional optical simulation. The optical simulation was performed for entrance angles (β) of 5 DEG and 30 DEG and for rotation angles (ε) of every 15 DEG in a range of 0 to 345 DEG. Arithmetic averages of the illuminances for respective rotation angles obtained as described above were calculated. Further, a variation of the illuminances for respective rotation angles was calculated for each of the entrance angles (β) of 5 DEG and 30 DEG and the variation was provided as a variation coefficient. Here, the variation coefficient means a ratio of a standard variation of illuminances to the arithmetic average of the illuminances and was calculated using the equation: (variation coefficient)=(standard variation of illuminances)/(arithmetic average of the illuminances)×100.

2. In each of Examples 1 to 30, values of the arithmetic averages of the illuminances for respective rotation angles were high for both of the entrance angles of 5 DEG and 30 DEG, and thus it was found that the examples had good entrance angle characteristics. Further, in each of Examples 1, 4, 5, 9, 20, 23, 24, and 26 to 30, a value of the arithmetic average of the illuminances was very high for the entrance angle of 5 DEG and in each of Examples 5, 6, and 9 to 12, a value of the arithmetic average of the illuminances was very high for the entrance angle of 30 DEG, and thus it was found that the examples had better entrance angle characteristics.

(Evaluation of Rotation Angle Characteristic)

TABLE 2

| | Arithmetic average of illuminances | | Variation coefficient | | Evaluation of entrance angle characteristic | | Evaluation of rotation angle characteristic |
|---|---|---|---|---|---|---|---|
| | | | Entrance angle (β) | | | | |
| | β = 5° | β = 30° | β = 5° | β = 30° | β = 5° | β = 30° | |
| Example 1 | 8098 | 3089 | 2.6% | 24.8% | A | B | B |
| Example 2 | 7819 | 3108 | 2.5% | 23.0% | B | B | B |
| Example 3 | 7505 | 3104 | 2.4% | 21.2% | B | B | A |
| Example 4 | 8360 | 3186 | 2.0% | 24.0% | A | B | B |
| Example 5 | 8115 | 3207 | 3.1% | 22.7% | A | A | A |
| Example 6 | 7805 | 3213 | 2.5% | 21.2% | B | A | A |
| Example 7 | 7544 | 3185 | 2.8% | 19.3% | B | B | A |
| Example 8 | 7301 | 3171 | 3.6% | 17.4% | B | B | A |
| Example 9 | 8257 | 3288 | 2.4% | 21.7% | A | A | A |
| Example 10 | 7872 | 3283 | 2.8% | 19.1% | B | A | A |
| Example 11 | 7620 | 3271 | 3.3% | 17.6% | B | A | A |
| Example 12 | 7289 | 3253 | 3.1% | 16.4% | B | A | A |
| Example 13 | 7027 | 3196 | 2.9% | 13.7% | B | B | A |
| Example 14 | 7145 | 2742 | 1.9% | 23.4% | B | B | B |
| Example 15 | 7423 | 2768 | 1.9% | 24.3% | B | B | B |
| Example 16 | 7023 | 2891 | 2.1% | 22.1% | B | B | A |
| Example 17 | 7308 | 2896 | 2.1% | 21.6% | B | B | A |
| Example 18 | 7601 | 2878 | 2.1% | 22.2% | B | B | A |
| Example 19 | 7925 | 2857 | 2.1% | 22.9% | B | B | A |
| Example 20 | 8210 | 2828 | 1.8% | 24.4% | A | B | B |
| Example 21 | 7264 | 3002 | 2.2% | 21.3% | B | B | A |
| Example 22 | 7723 | 2973 | 2.2% | 21.7% | B | B | A |
| Example 23 | 8022 | 2959 | 2.1% | 22.5% | A | B | A |
| Example 24 | 8333 | 2927 | 1.8% | 24.9% | A | B | B |
| Example 25 | 7895 | 3032 | 2.3% | 21.6% | B | B | A |
| Example 26 | 8385 | 2986 | 2.0% | 23.3% | A | B | B |
| Example 27 | 8458 | 2948 | 0.7% | 24.7% | A | B | B |
| Example 28 | 8194 | 2952 | 2.2% | 23.0% | A | B | B |
| Example 29 | 8424 | 2909 | 0.7% | 24.9% | A | B | B |
| Example 30 | 8299 | 2843 | 1.3% | 24.7% | A | B | B |
| Example 31 | 8381 | 2590 | 1.1% | 22.4% | A | B | A |
| Comparative Example 1 | 8221 | 2736 | 1.3% | 41.7% | A | B | C |
| Comparative Example 1 | 7341 | 2751 | 0.2% | 25.7% | B | B | C |

(Evaluation of Entrance Angle Characteristic)

For the entrance angle of 5 DEG, the entrance angle characteristic was evaluated as "A" when the arithmetic average of illuminances on the evaluation surface was 8000 or more, as "B" when the arithmetic average of illuminances on the evaluation surface was 7000 or more and less than 8000, and as "C" when the arithmetic average of illuminances on the evaluation surface was less than 7000. For the entrance angle of 30 DEG, the entrance angle characteristic was evaluated as "A" when the arithmetic average of illuminances on the evaluation surface was 3200 or more, as "B" when the arithmetic average of illuminances on the evaluation surface is 2500 or more and less than 3200, and as "C" when the arithmetic average of illuminances on the evaluation surface was less than 2500. Results of the simulations are shown in Table For the entrance angle of 30 DEG, the rotation angle characteristic was evaluated as "A" when the Variation coefficient was less than 23%, as "B" when the variation coefficient was 23% or more and less than 25%, and as "C" when the variation coefficient was 25% or more. Results of the simulations are shown in Table 2. In each of Examples 1 to 31, the variation coefficient was suppressed to be low, and thus it was found that the examples had good rotation angle characteristics. In Comparative Examples 1 and 2, the variation coefficients for the entrance angle of 30 DEG were respectively 41.7% and 25.7%, and thus it was found that the variation coefficients were large.

INDUSTRIAL APPLICABILITY

According to the invention, a retroreflective article that is excellent in an entrance angle characteristic, an observing angle characteristic, and a rotation angle characteristic can be provided, and a retroreflective article that can be preferably used for traffic signs, construction work signs, retroreflective clothing, reflectors for optical sensors, vehicle markings, or the like can be provided.

The invention claimed is:

1. A cube-corner retroreflective article comprising a number of cube-corner retroreflective element pairs each formed by a pair of cube-corner retroreflective elements sharing one side, each of the cube-corner retroreflective elements having reflective lateral surfaces including two trapezoidal reflective lateral surfaces and one pentagonal or isosceles-triangular reflective lateral surface, and having a projection shape of a quadrangle when projected onto a common plane, wherein
    ratios (rHA/rHC and rHB/rHC) between a length (rHC) of a ridge (Hc) shared by the trapezoidal reflective lateral surfaces (HAFC and HBGC) and lengths (rHA and rHB) of other ridges (HA and HB) are in a range of 0.5 to 1.5;
    ratios (Sc/Sa and Sc/Sb) between areas (Sa and Sb) of the trapezoidal reflective lateral surfaces (HAFC and HBGC) and an area (Sc) of the pentagonal reflective lateral surface (HADEB) or the isosceles-triangular reflective lateral surface (HAB) is in a range of 0.6 to 1.4; and
    a ratio (rHK/rHC) between the length (rHC) of the ridge (HC) and a length (rHK) of a perpendicular (HK) from an apex (H) of each of the cube-corner retroreflective elements to a shared base (DE) is in a range of 0.55 to 1.8.

2. The cube-corner retroreflective article according to claim 1, wherein the ratios (rHA/rHC and rHB/rHC) are in a range of 0.7 to 1.5.

3. The cube-corner retroreflective article according to claim 2, wherein the ratios (rHA/rHC and rHB/rHC) are in a range of 0.8 to 1.2.

4. The cube-corner retroreflective article according to claim 2, wherein the ratios (Sc/Sa and Sc/Sb) are in a range of 0.95 to 1.05.

5. The cube-corner retroreflective article according to claim 3, wherein the ratios (Sc/Sa and Sc/Sb) are in a range of 0.97 to 1.03.

6. The cube-corner retroreflective article according to claim 4, wherein the ratio (rHK/rHC) is in a range of 0.65 to 1.65.

7. The cube-corner retroreflective article according to claim 5, wherein the ratio (rHK/rHC) is in a range of 0.8 to 1.4.

8. The cube-corner retroreflective article according to claim 6, wherein a tilt angle ($\theta$) of optical axes of the cube-corner retroreflective elements is −30 to +30 DEG.

9. The cube-corner retroreflective article according to claim 7, wherein a tilt angle ($\theta$) of optical axes of the cube-corner retroreflective elements is −20 to −5 DEG or +5 to +20 DEG.

10. The cube-corner retroreflective article according to claim 8, wherein the length (rHC) of the ridge (HC) is 30 to 500 μm.

11. The cube-corner retroreflective article according to claim 9, wherein the length (rHC) of the ridge (HC) is 50 to 150 μm.

* * * * *